(12) United States Patent
Natanzon et al.

(10) Patent No.: US 8,832,399 B1
(45) Date of Patent: *Sep. 9, 2014

(54) VIRTUALIZED CONSISTENCY GROUP USING AN ENHANCED SPLITTER

(71) Applicants: Assaf Natanzon, Tel Aviv (IL); Yuval Aharoni, Kfar Saba (IL)

(72) Inventors: Assaf Natanzon, Tel Aviv (IL); Yuval Aharoni, Kfar Saba (IL)

(73) Assignee: EMC International Company, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,526

(22) Filed: Apr. 1, 2013

Related U.S. Application Data

(63) Continuation of application No. 12/890,923, filed on Sep. 27, 2010, now Pat. No. 8,433,869.

(51) Int. Cl.
*G06F 12/00* (2006.01)
*G06F 11/14* (2006.01)
*G06F 3/06* (2006.01)

(52) U.S. Cl.
CPC ........ *G06F 11/1451* (2013.01); *G06F 11/1458* (2013.01); *G06F 3/0631* (2013.01); *G06F 3/0665* (2013.01)
USPC ............... 711/162; 711/4; 711/112; 711/114; 714/6.1; 714/6.2; 714/6.22

(58) Field of Classification Search
CPC ............ G06F 11/1451; G06F 11/1458; G06F 3/0631; G06F 3/0665
USPC ..................... 711/162, 4, 112, 114, 154, 156; 714/6.1, 6.2, 6.22
See application file for complete search history.

(56) References Cited

U.S. PATENT DOCUMENTS

| | | |
|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Microsoft Computer Dictionary, 2002 Press Fifth Edition, p. 58.

(Continued)

*Primary Examiner* — Stephen Elmore
(74) *Attorney, Agent, or Firm* — Daly, Crowley, Mofford & Durkee, LLP

(57) ABSTRACT

In one aspect, a method includes forming a virtualized grid consistency group to replicate a logical unit, running a first grid copy on a first data protection appliance (DPA) replicating a first portion of the logical unit, running a second grid copy on a second DPA replicating a second portion of the logical unit, sending IOs to the first DPA if the IOs are to a first set of offsets and sending IOs to the second DPA if the IOs are to a second set of offsets.

20 Claims, 29 Drawing Sheets

(56) References Cited

U.S. PATENT DOCUMENTS

| | | | |
|---|---|---|---|
| 6,065,018 | A | 5/2000 | Beier et al. |
| 6,143,659 | A | 11/2000 | Leem |
| 6,148,340 | A | 11/2000 | Bittinger et al. |
| 6,174,377 | B1 | 1/2001 | Doering et al. |
| 6,174,809 | B1 | 1/2001 | Kang et al. |
| 6,203,613 | B1 | 3/2001 | Gates et al. |
| 6,260,125 | B1 | 7/2001 | McDowell |
| 6,270,572 | B1 | 8/2001 | Kim et al. |
| 6,272,534 | B1 | 8/2001 | Guha |
| 6,287,965 | B1 | 9/2001 | Kang et al. |
| 6,467,023 | B1 | 10/2002 | DeKoning et al. |
| 6,574,657 | B1 | 6/2003 | Dickinson |
| 6,621,493 | B1 | 9/2003 | Whitten |
| 6,804,676 | B1 | 10/2004 | Bains, II |
| 6,947,981 | B2 | 9/2005 | Lubbers et al. |
| 7,043,610 | B2 | 5/2006 | Horn et al. |
| 7,076,620 | B2 | 7/2006 | Takeda et al. |
| 7,111,197 | B2 | 9/2006 | Kingsbury et al. |
| 7,117,327 | B2 | 10/2006 | Hirakawa et al. |
| 7,120,768 | B2 | 10/2006 | Mizuno et al. |
| 7,130,975 | B2 | 10/2006 | Suishu et al. |
| 7,139,927 | B2 | 11/2006 | Park et al. |
| 7,146,439 | B1 | 12/2006 | Ofer et al. |
| 7,159,088 | B2 | 1/2007 | Hirakawa et al. |
| 7,167,963 | B2 | 1/2007 | Hirakawa et al. |
| 7,222,136 | B1 | 5/2007 | Brown et al. |
| 7,296,008 | B2 | 11/2007 | Passerini et al. |
| 7,328,373 | B2 | 2/2008 | Kawamura et al. |
| 7,360,113 | B2 | 4/2008 | Anderson et al. |
| 7,426,618 | B2 | 9/2008 | Vu et al. |
| 7,516,287 | B2 | 4/2009 | Ahal et al. |
| 7,519,625 | B2 | 4/2009 | Honami et al. |
| 7,519,628 | B1 | 4/2009 | Leverett |
| 7,546,485 | B2 | 6/2009 | Cochran et al. |
| 7,577,867 | B2 | 8/2009 | Lewin et al. |
| 7,606,940 | B2 | 10/2009 | Yamagami |
| 7,627,612 | B2 | 12/2009 | Ahal et al. |
| 7,627,687 | B2 | 12/2009 | Ahal et al. |
| 7,719,443 | B1 | 5/2010 | Natanzon |
| 7,757,057 | B2 | 7/2010 | Sangapu et al. |
| 7,769,931 | B1 | 8/2010 | Angelone et al. |
| 7,774,565 | B2 | 8/2010 | Lewin et al. |
| 7,797,358 | B1 | 9/2010 | Ahal et al. |
| 7,844,856 | B1 | 11/2010 | Ahal et al. |
| 7,849,361 | B2 | 12/2010 | Ahal et al. |
| 7,860,836 | B1 | 12/2010 | Natanzon et al. |
| 7,882,286 | B1 | 2/2011 | Natanzon et al. |
| 7,904,681 | B1 | 3/2011 | Bappe et al. |
| 7,908,515 | B1 | 3/2011 | Schechner et al. |
| 7,945,640 | B1 | 5/2011 | Van Tine |
| 7,958,372 | B1 | 6/2011 | Natanzon |
| 7,962,567 | B1 | 6/2011 | Sandstrom et al. |
| 8,108,634 | B1 | 1/2012 | Natanzon et al. |
| 8,122,212 | B2 * | 2/2012 | Otani et al. ............ 711/162 |
| 8,140,821 | B1 | 3/2012 | Raizen et al. |
| 8,150,936 | B2 | 4/2012 | Liu et al. |
| 8,166,314 | B1 | 4/2012 | Raizen et al. |
| 8,205,009 | B2 | 6/2012 | Heller et al. |
| 8,271,447 | B1 | 9/2012 | Natanzon et al. |
| 8,332,687 | B1 | 12/2012 | Natanzon et al. |
| 8,335,771 | B1 | 12/2012 | Natanzon et al. |
| 8,392,680 | B1 * | 3/2013 | Natanzon et al. ............ 711/162 |
| 8,656,070 | B2 * | 2/2014 | Zwisler et al. ............ 710/36 |
| 2002/0129168 | A1 | 9/2002 | Kanai et al. |
| 2003/0061537 | A1 | 3/2003 | Cha et al. |
| 2003/0110278 | A1 | 6/2003 | Anderson |
| 2003/0196147 | A1 | 10/2003 | Hirata et al. |
| 2004/0205092 | A1 | 10/2004 | Longo et al. |
| 2004/0250032 | A1 | 12/2004 | Ji et al. |
| 2004/0254964 | A1 | 12/2004 | Kodama et al. |
| 2005/0015663 | A1 | 1/2005 | Armangau et al. |
| 2005/0028022 | A1 | 2/2005 | Amano |
| 2005/0049924 | A1 | 3/2005 | DeBettencourt et al. |
| 2005/0172092 | A1 | 8/2005 | Lam et al. |
| 2005/0273655 | A1 | 12/2005 | Chow et al. |
| 2006/0031647 | A1 | 2/2006 | Hirakawa et al. |
| 2006/0047996 | A1 | 3/2006 | Anderson et al. |
| 2006/0064416 | A1 | 3/2006 | Sim-Tang |
| 2006/0107007 | A1 | 5/2006 | Hirakawa et al. |
| 2006/0117211 | A1 | 6/2006 | Matsunami et al. |
| 2006/0161810 | A1 | 7/2006 | Bao |
| 2006/0195670 | A1 | 8/2006 | Iwamura et al. |
| 2006/0212462 | A1 | 9/2006 | Heller et al. |
| 2007/0055833 | A1 | 3/2007 | Vu et al. |
| 2007/0180304 | A1 | 8/2007 | Kano |
| 2007/0198602 | A1 | 8/2007 | Ngo et al. |
| 2007/0198791 | A1 | 8/2007 | Iwamura et al. |
| 2007/0266053 | A1 | 11/2007 | Ahal et al. |
| 2008/0082592 | A1 | 4/2008 | Ahal et al. |

OTHER PUBLICATIONS

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

Office Action dated Jan. 23, 2012, U.S. Appl. No. 12/818,236, 17 pages.

Soules, Metadata Efficiency in Versioning File Systems, 2003, pp. 1-16.

AIX System Management Concepts: Operating Systems and Devices May 2000, pp. 1-280.

Office Action dated Mar. 31, 2009 for U.S. Appl. No. 11/609,560, 15 pages.

Response to Office Action filed Jun. 10, 2009 in U.S. Appl. No. 11/609,560, 18 pages.

Office Action dated Oct. 21, 2009 for U.S. Appl. No. 11/609,560, 34 pages.

Response to Office Action filed on Jan. 14, 2010 in U.S. Appl. No. 11/609,560, 16 pages.

Notice of Allowance dated Sep. 27, 2011 for U.S. Appl. No. 11/609,560, 13 pages.

Office Action dated Aug. 17, 2011 for U.S. Appl. No. 12/057,652, 19 pages.

Response to Office Action filed on Sep. 1, 2011 in U.S. Appl. No. 12/057,652, 9 pages.

Notice of Allowance dated Sep. 27, 2011 for U.S. Appl. No. 12/057,652, 8 pages.

Office Action dated Jun. 11, 2009 for U.S. Appl. No. 11/609,561 7 pages.

Response to Office Action filed on Sep. 16, 2009 in U.S. Appl. No. 11/609,561 12 pages.

Office Action dated Jan. 11, 2010 for U.S. Appl. No. 11/609,561 10 pages.

Pre-Appeal Brief Request for Review filed Mar. 25, 2010 in U.S. Appl. No. 11/609,561 6 pages.

Notice of Panel Decision from Pre-Appeal Brief Review dated Jul. 16, 2010 in U.S. Appl. No. 11/609,561, 2 pages.

Notice of Allowance dated Sep. 14, 2010 in U.S. Appl. No. 11/609,561, 7 pages.

Office Action dated Sep. 30, 2008 in U.S. Appl. No. 11/356,920, 34 pages.

Response to Office Action filed Dec. 19, 2008 in U.S. Appl. No. 11/356,920, 23 pages.

Notice of Allowance dated Apr. 20, 2009 in U.S. Appl. No. 11/356,920, 10 pages.

Office Action dated Dec. 12, 2007 in U.S. Appl. No. 10/512,687, 20 pages.

Response to Office Action filed on Jun. 9, 2008 in U.S. Appl. No. 10/512,687, 14 pages.

Office Action dated Sep. 10, 2008 in U.S. Appl. No. 10/512,687, 16 pages.

Response to Office Action filed on Dec. 9, 2008 in U.S. Appl. No. 10/512,687, 13 pages.

Advisory Action dated Jan. 7, 2009 in U.S. Appl. No. 10/512,687, 3 pages.

(56) References Cited

OTHER PUBLICATIONS

Response to Office Action filed on Feb. 10, 2009 in U.S. Appl. No. 10/512,687, 23 pages.
Office Action dated Apr. 3, 2009 in U.S. Appl. No. 10/512,687, 16 pages.
Response to Office Action filed on Jul. 28, 2009 in U.S. Appl. No. 10/512,687, 18 pages.
Office Action dated Nov. 18, 2009 in U.S. Appl. No. 10/512,687, 20 pages.
Response to Office Action filed on Mar. 15, 2010 in U.S. Appl. No. 10/512,687, 19 pages.
Office Action dated Oct. 20, 2011 in U.S. Appl. No. 10/512,687, 28 pages.
Response to Office Action filed on Jan. 10, 2012 in U.S. Appl. No. 10/512,687, 14 pages.
Notice of Allowance dated Apr. 27, 2012 in U.S. Appl. No. 10/512,687, 7 pages.
Office Action dated Sep. 23, 2008 in U.S. Appl. No. 11/536,215, 8 pages.
Response to Office Action filed on Nov. 19, 2008 in U.S. Appl. No. 11/536,215, 10 pages.
Notice of Allowance dated Dec. 10, 2008 in U.S. Appl. No. 11/536,215, 9 pages.
Office Action dated Aug. 19, 2008 in U.S. Appl. No. 11/536,233, 8 pages.
Response to Office Action filed on Sep. 17, 2008 in U.S. Appl. No. 11/536,233, 9 pages.
Office Action dated Oct. 27, 2008 in U.S. Appl. No. 11/536,233, 5 pages.
Response to Office Action filed on Nov. 25, 2008 in U.S. Appl. No. 11/536,233, 11 pages.
Office Action dated Mar. 6, 2009 in U.S. Appl. No. 11/536,233, 29 pages.
Response to Office Action filed on Jun. 3, 2009 in U.S. Appl. No. 11/536,233, 16 pages.
Notice of Allowance dated Sep. 16, 2009 in U.S. Appl. No. 11/536,233, 3 pages.
Office Action dated Apr. 23, 2009 in U.S. Appl. No. 11/536,160, 21 pages.
Response to Office Action filed on Jun. 9, 2009 in U.S. Appl. No. 11/536,160, 12 pages.
Notice of Allowance dated Aug. 31, 2009 in U.S. Appl. No. 11/536,160, 19 pages.
Office Action dated Mar. 25, 2010 in U.S. Appl. No. 11/964,168, 17 pages.
Response to Office Action filed on Apr. 13, 2010 in U.S. Appl. No. 11/964,168, 10 pages.
Notice of Allowance dated Jul. 8, 2010 in U.S. Appl. No. 11/964,168, 8 pages.

* cited by examiner

Virtual Consistency Group 600

| Consistency Group 0 630 | Consistency Group 1 640 | Consistency Group 2 650 | Consistency Group n-1 660 |
|---|---|---|---|
| Journal 635 | Journal 645 | Journal 655 | Journal 665 |
| Replication Journal 620 | | | |
| DPA 670 | DPA 672 | DPA 674 | DPA 676 |

| Virtual Consistency Group 1200 | | | |
|---|---|---|---|
| Consistency Group 0 1230 | Consistency Group 1 1240 | Consistency Group 2 1250 | Consistency Group n-1 1260 |
| Journal 1235 | Journal 1245 | Journal 1255 | Journal 1265 |
| Time t1 | Time t1 | Time t1 | Time t1 |
| Time t2 | Time t2 | Time t2 | Time t2 |
| Time t3 | Time t3 | Time t3 | Time t3 |
| ... | ... | ... | ... |
| Time tn | Time tn | Time tn | Time tn |

VIRTUALIZED CONSISTENCY GROUP USING AN ENHANCED SPLITTER

CROSS REFERENCE TO RELATED APPLICATIONS

This application is a Continuation Application of and claims priority to U.S. patent application Ser. No. 12/890,923, filed Sep. 27, 2010, and entitled "A VIRTUALIZED CONSISTENCY GROUP USING AN ENHANCED SPLITTER," which is incorporated herein by reference in its entirety.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling roll back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes forming a virtualized grid consistency group to replicate a logical unit, running a first grid copy on a first data protection appliance (DPA) replicating a first portion of the logical unit, running a second grid copy on a second DPA replicating a second portion of the logical unit, sending IOs to the first DPA if the IOs are to a first set of offsets and sending IDs to the second DPA if the IOs are to a second set of offsets.

In another aspect, an article includes a non-transitory machine-readable medium that stores executable instructions. The instructions cause a machine to form a virtualized grid consistency group to replicate a logical unit, run a first grid copy on a first data protection appliance (DPA) replicating a first portion of the logical unit, run a second grid copy on a second DPA replicating a second portion of the logical unit, send IOs to the first DPA if the IOs are to a first set of offsets and send IOs to the second DPA if the IOs are to a second set of offsets.

In a further aspect, an apparatus includes circuitry to form a virtualized grid consistency group to replicate a logical unit, run a first grid copy on a first data protection appliance (DPA) replicating a first portion of the logical unit, run a second grid copy on a second DPA replicating a second portion of the logical unit, send IOs to the first DPA if the IOs are to a first set of offsets and said IOs to the second DPA if the IOs are to a second set of offsets. The circuitry comprises at least one of a processor, a memory, programmable logic or logic gates.

DESCRIPTION OF THE DRAWINGS

FIG. 6 is a block diagram of further example of the virtual consistency group.

FIG. 12 is a block diagram of time stamps across grid copies of a virtual consistency group.

FIG. 13A is a block diagram of another example of time stamps across grid copies of a virtual consistency group.

DETAILED DESCRIPTION

Figure 1:
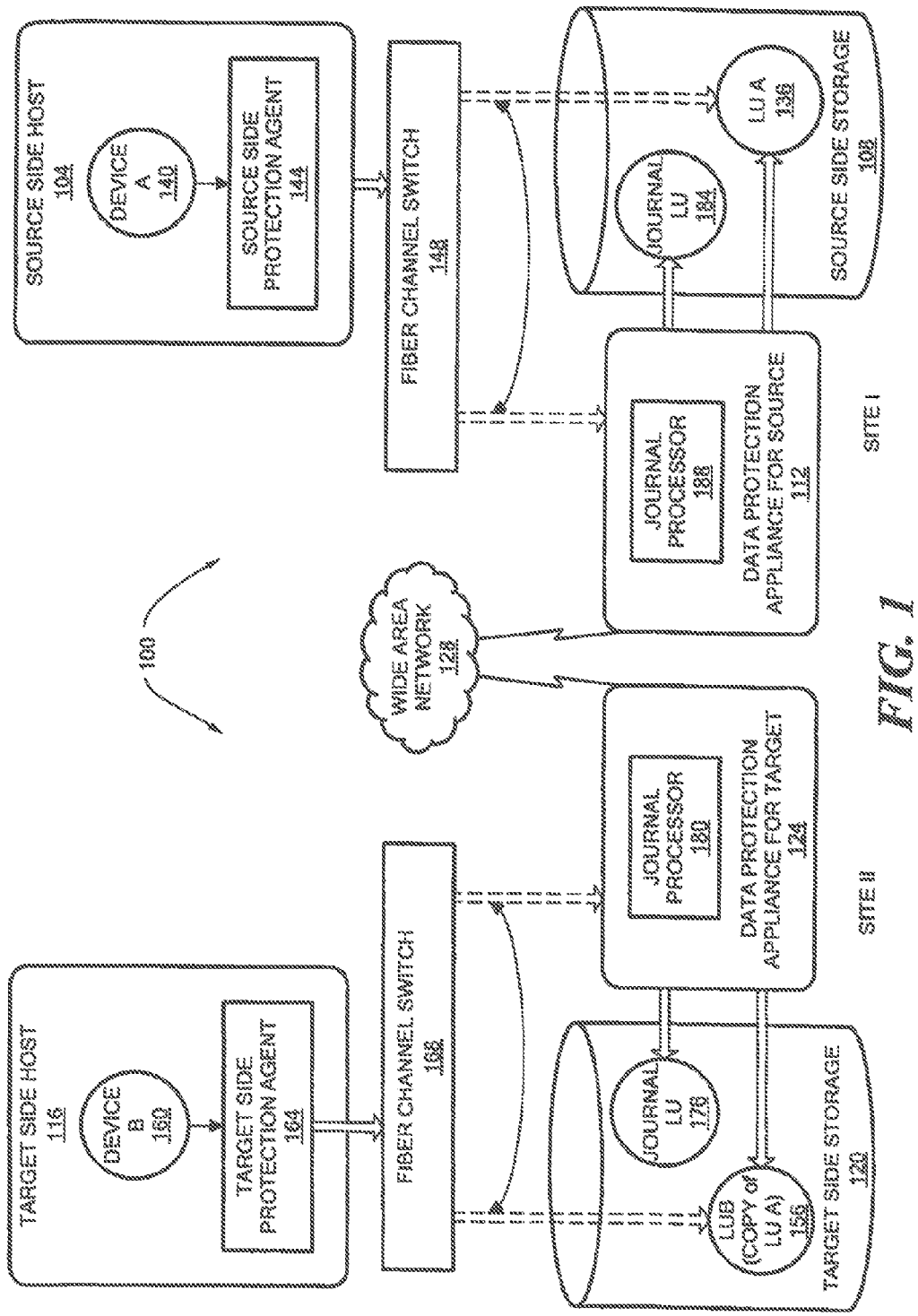
FIG. 1 is a block diagram of an example of a data protection system.

Described herein are various techniques to replicate data using consistency groups. Replication of one consistency group may be across several replication appliances (called herein data protection appliances (DPA)). In one example, volumes may be striped. Each volume may be presented as a set of stripes striped volume. A new virtual CG may be formed which may include several internal CGs. The virtual CG may be presented to the user and the user may be able to perform all actions on the virtual CG. Internally, in some examples, each internal CG may replicate just some of the stripes of the volumes. As well a consistency point may be achieved across internal CGs. That is, it may be possible to form an image of a particular time by rolling each internal CG group to that time. In some examples, the internal CGs may not be exposed to the user and all actions happen automatically on the internal CGs when performed on the virtual CG. Internal CG groups may also be referred to as Grid Copies. In a further example, one box may be accepting all the IOs, this box will split the IOs between relevant boxes running the consistency groups. In one example, each grid CG may receive its own IOs.

Typical replication technologies either run in the array or run on network or host. Conventional array based technologies are limited to the internal array and are homogenous, network technologies limited to replicating whole LUs (logical units). The typical arrays have trouble replicating a high performance environment in a single consistency group, or have trouble with real time load balancing. Current host based replication is usually limited, intrusive and cannot replicate data shared in clusters. Conversely, the current specification, in some examples, enable load balancing though the volume virtualization and enables high performance replication using clusters of replication devices.

The following definitions may be useful in understanding the specification and claims.

BACKUP SITE—a facility where replicated production site data is stored; the backup site may be located in a remote site or at the same location as the production site;

Data Protection Appliance (DPA)—a computer or a cluster of computers responsible for data protection services including inter alia data replication of a storage system, and journaling of IO requests issued by a host computer to the storage system;

CG—consistency group—a set of logical units (LUs) which are replicated together for which write order fidelity is preserved.

Grid MCG—a Consistency group that may be replicated across several DPA this is the Consistency Group that is presented to the user Grid ICG—a part of the grid Consistency Group that is replicated by one DPA Marking Box—the DPA that runs the grid ICD which accepts all the data and splits it to the relevant boxes.

HOST—at least one computer or networks of computers that runs at least one data processing application that issues IO requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues IO requests;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SPLITTER ACKNOWLEDGEMENT—an acknowledgement from a DPA to the protection agent that data has been received at the DPA; this may be achieved by SCSI status cmd.

SAN—a storage area network of nodes that send and receive IO and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to IO requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

REMOTE ACKNOWLEDGEMENTS—an acknowledgement from remote DPA to the local DPA that data arrived at the remote DPA (either to the appliance or the journal)

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

During normal operations, the direction of replicate data flow goes from source side to target side, It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical its for access by multiple SAN initiators.

Logical units are a logical entity provided by a storage system, for accessing data stored in the storage system. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an IO interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues IO requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an IO rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of IO requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocols. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

DPAs 112 and 124 are configured to act as initiators in the SAN; i.e., they can issue IO requests using, for example, SCSI commands, to access logical units on their respective storage systems. DPA 112 and DPA 124 are also configured with the necessary functionality to act as targets; i.e., to reply to IO requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits IO requests issued by a host computer to the host device corresponding to that logical unit. Similarly, when a DPA behaves as a target device for a certain logical unit, then during normal course of operation, the associated protection agent fails IO requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI IO write requests. A replicated SCSI IO write request is sent to DPA 112. After receiving an acknowledgement from DPA 124, protection agent 144 then sends the SCSI IO write request to LU A. After receiving a second acknowledgement from storage system 108 host computer 104 acknowledge that an IO command complete.

When DPA 112 receives a replicated SCSI write request from data protection agent 144, DPA 112 transmits certain IO information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each IO request, before receiving an acknowledgement back from DPA 124.

In snapshot mode, DPA 112 receives several 110 requests and combines them into an aggregate "snapshot" of all write activity performed in the multiple IO requests, and sends the snapshot to DPA 124, for journaling and for incorporation in target storage system 120. In snapshot mode DPA 112 also sends an acknowledgement to protection agent 144 upon receipt of each IO request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending IO requests to LU B. To prevent such IO requests from being sent, protection agent 164 acts as a target site protection agent for host Device B and fails IO requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit, DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B, updates the journal entries in the journal LU with undo information, applies the journal transactions to LU B, and removes already-applied transactions from the journal.

Figure 2:
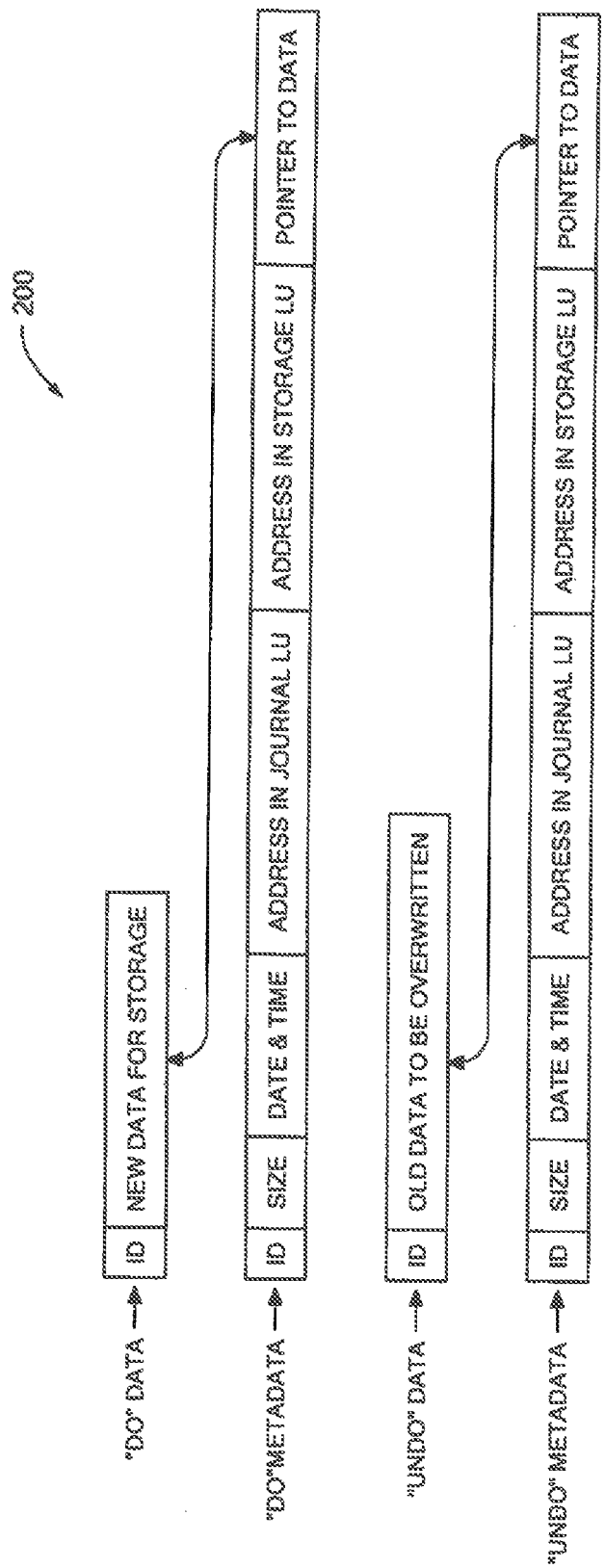
FIG. 2 is an illustration of an example of a journal history of write transactions for a storage system.

Referring to FIG. 2, which is an illustration of a write transaction 200 for a journal. The journal may be used to pr vide an adaptor for access to storage 120 at the state it was in at any specified point in time. Since the journal contains the "undo" information necessary to roil back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Virtualized Consistency Groups

A virtualized consistency Group may be used to present a single consistency Group which may span several different appliances. In some examples, forming one large consistency group is achieved by n internal consistency groups or grid copies. Each grid copy may have the same configuration as the original consistency group, i.e., user volumes and journal volumes. Each internal CG may be called a Grid Copy.

Figure 3:
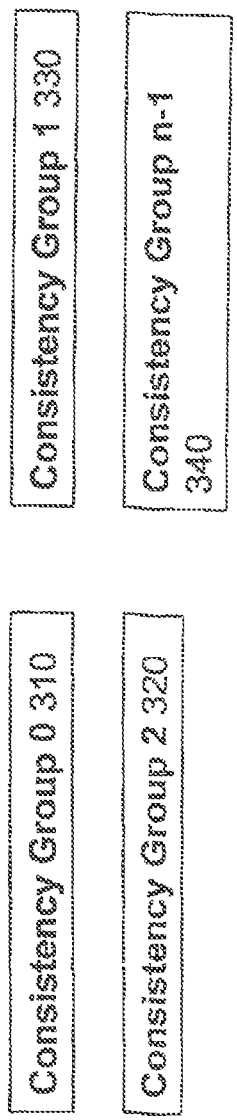
FIG. 3 is a block diagram of an example of consistency groups.
Figure 4:
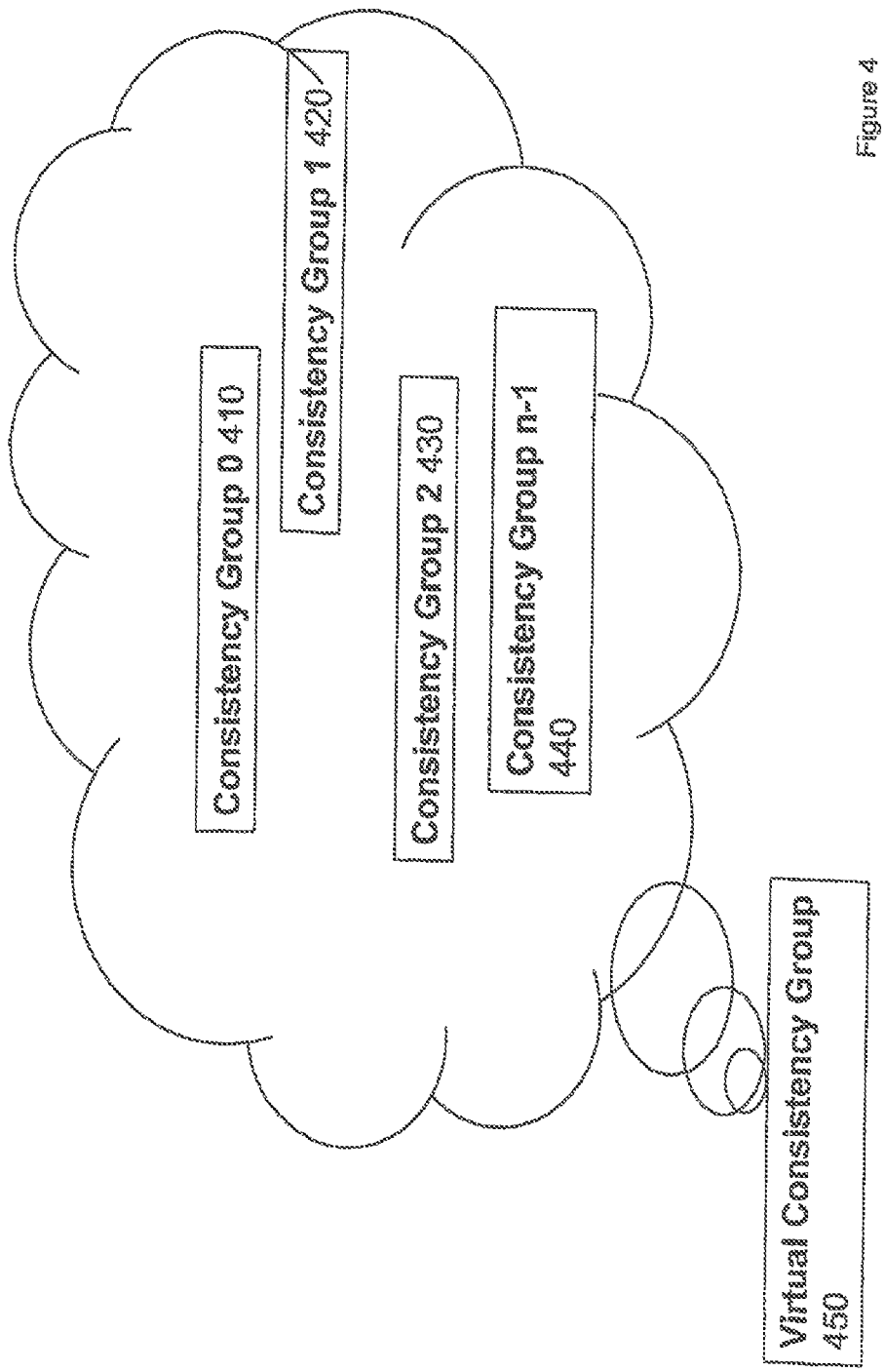
FIG. 4 is a block diagram of an example of a virtual consistency group.

The grid copies may be numbered 0, . . . , n-1 where grid copy zero may be a special grid copy. For example refer to FIGS. 3 and 4. FIG. 3 illustrates a sample internal consistency groups or grid copies, consistency group 310, 320, 330 and 340. FIG. 4 illustrates how these consistency groups 410, 420, 430, and 440 may be used to create a virtual consistency group 450.

Figure 5:
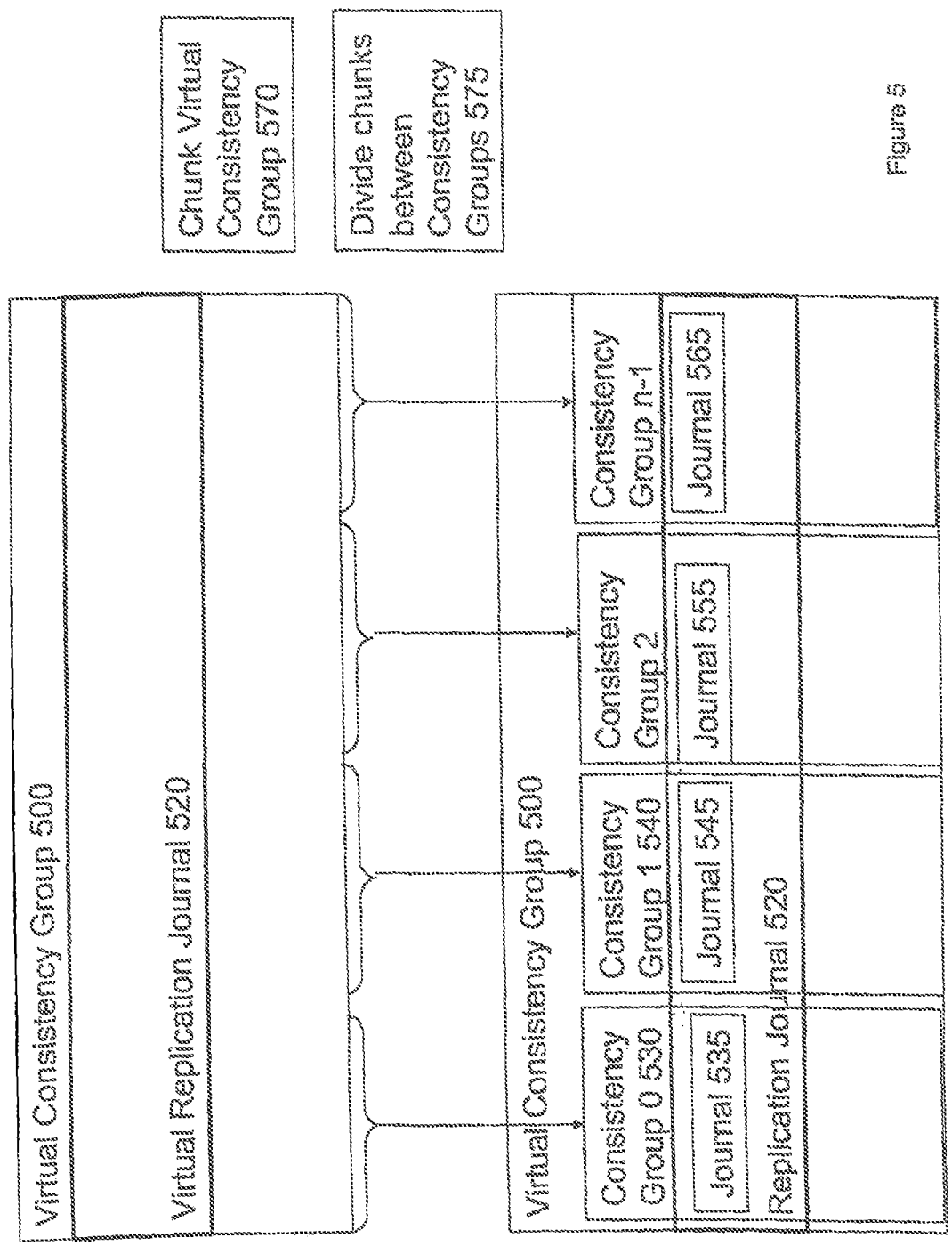
FIG. 5 is a block diagram of another example of the virtual consistency group.

Referring to FIG. 5, a Virtual Consistency group 500 is shown. This Virtual consistency group 500 may have a virtual replication journal 520 and may be presented to the user. In some examples, the virtual journal, such as virtual journal 520 may be created by the user. The Virtual consistency group may include several consistency groups or grid copies, such as grid copies 530, 540, 550, and 560. These grid copies may each be responsible for a portion of the replication handled by the consistency group. As well, each grid copy may have a journal, such as journals 535, 545, 555, and 565 which may correspond to a piece or segment of the replication journal 520 of the virtual consistency group 500. The user volumes of consistency group 500 are chunked 570 and divided 575 between the grid copies.

Referring to FIG. 6, each grid copy can run on a different Data protection appliance such as DPA 670, 672, 674, and 676. As well, a DPA may run multiple grid copies. Each grid copy may contain a portion of the virtual replication journal 620 for a replication of a volume or multiple volumes. That is, each grid copy, 630, 640, 650, and 660 may be responsible for recording a portion of the journal 620, which corresponds to a portion of the replication of the virtual consistency group 600. Replication of user volumes may be divided into sections and each grid copy, 630, 640, 650, and 660 may be responsible for an equal section, each grid copy may be responsible for replicating its portion of the user volumes and every grid copy may create its own journal curved from the global journal. The grid copy may use the piece of the journal corresponding to that section, such as Journals 635, 645, 655, and 665, to generate a DO stream and UNDO stream for each section.

Figure 7:
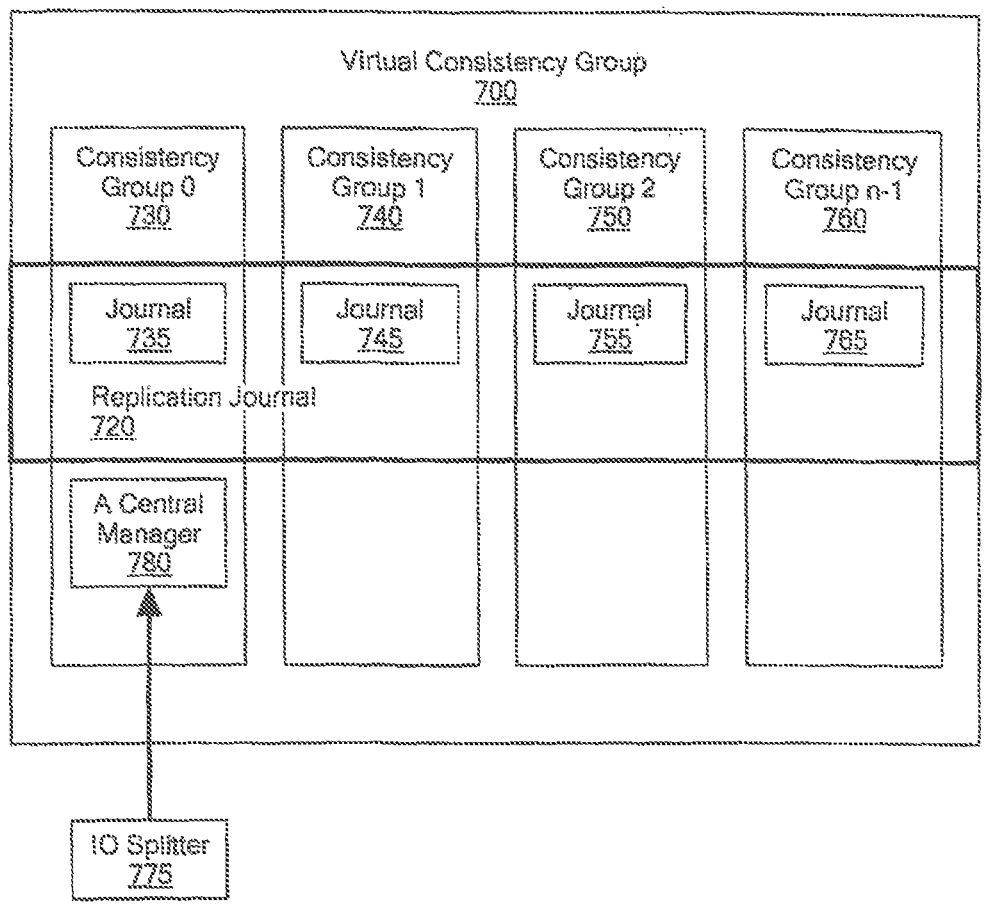
FIG. 7 is a block diagram of an example of the virtual consistency group receiving IO.

Referring to FIG. 7, the virtual consistency group 700 includes grid copies 730, 740, 750 and 760 and may he responsible for recording a portion of the journal 720. The grid copy may use the piece of the journal corresponding to that section, such as Journals 735, 745, 755, and 765, to generate a DO stream and UNDO stream for each section. The consistency group 0 730 (grid copy 0) includes a central manager 780.

The grid, copy zero 730 may he different from other grid copies as it may manage the accounting for virtual consistency group. That is, all IOs from the splitter 775 may be directed to the grid copy zero. Further, the virtual consistency group 700 may he used for replication of a single volume. As well, the virtual consistency group 700 may be used to replicate multiple volumes. In one example, the virtual consistency group 700 may represent any number of underlying consistency groups, grid copies, or DPAs, however the virtual consistency group may be presented to the user as a single consistency group.

Splitting Data

All IOs from the splitter 775 may arrive at grid copy zero 730. This grid copy 730 may handle the marking of the data, where marking may mean the tracking of changes to the data. The user volume or volumes to be replicated by the virtual consistency group may be divided into chunks, where each chunk may be handled by a different grid copy of the virtual consistency group. In some examples, grid copy zero may be responsible for sending the IOs to the correct grid copy, the grid copy group may also handle the IO. The grid copy group may compress the data and may send it to the replica site where it may be written to the relevant journal. This may include grid copy zero splitting IOs into two or more parts when necessary.

Figure 8:
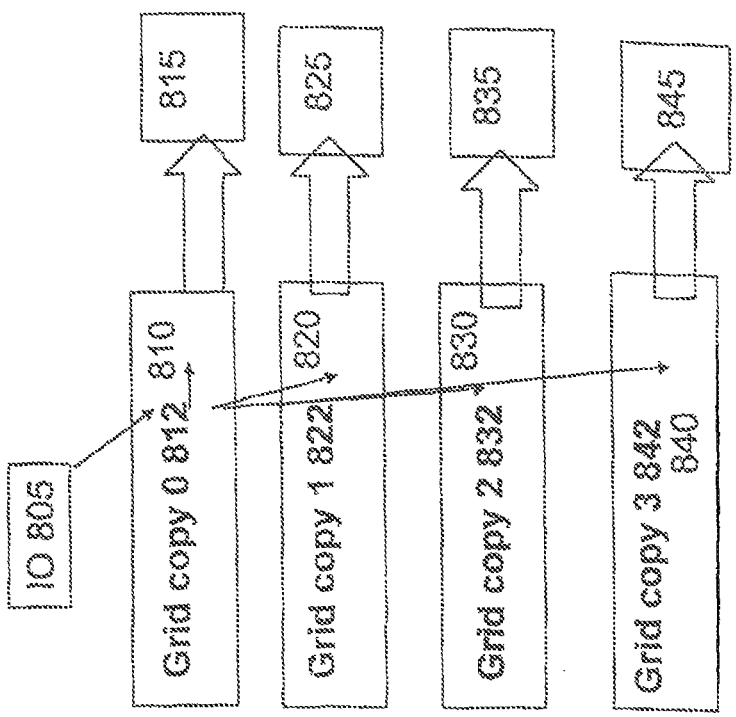
FIG. 8 is a block diagram of another example of the virtual consistency group receiving IO.

Referring to FIG. 8, IOs 805 reach appliance 810 of grid CG 0. Grid copy zero 812 receives the IO 805. Grid copy zero 812 may send the IO it to the DPAs, such as DPA 820, 830, and 840, which hold the grid CGs 822, 834, and 842, relevant to the IO. In some examples a single DPA may store multiple grid copies and IO for the multiple grid copies may be sent to a single DPA. Each grid copy may handle the IO, for example compress the IO and sending the IO to remote, such as remotes 815, 825, 835, and 845, and on the remote site write it to journal. As well, IOs may be transferred from grid copy zero to other grid copies on a first medium, for example small computer system interface (SCSI) over fiber channel, and data from each grid copy to its replica counterpart may be transferred on another medium such as Internet Protocol (IP), or vice versa.

In some examples, a delta marking stream may be a stream of metadata, containing volume ID, offset and length. The delta marking stream may be used to track the difference(s) between a production and a replica site, and to allow for resynchronization of portions of the data, in case the replication process stopped. For example, replication may stop because of a network (e.g., a wide area network (WAN) problem or other problems causing connectivity issues. The metadata stream may be persistently stored on the journal of the production site. The delta marking stream may be maintained by grid copy 0.

Freeing data from the delta marking stream may be done when data arrives to both production and replica copies. Thus data can be freed from the delta marking stream, when data reaches the production storage and all remote virtual CGs, the algorithm will free until the minimum of the point is reached in the remote copies.

Bookmark Creation

In further examples, the grid copy zero may also responsible for creating consistent points in time bookmarks across all the grid copies, grid copy zero may do so by sending a message every second to all grid copies with the same time stamp. The message may arrive to all grid copies and creates a barrier which may enforce consistency. A bookmark may be created by adding a small message to the journal of each grid copy.

For example, in some examples, grid copy zero will send a time stamp to each grid copy. Each grid copy may use this time stamp to mark time in the journal for that grid copy. As well, each grid copy may use this time stamp to roll forward and backward in the journal. That is, the time stamp allows the grid copy to apply do and undo metadata to reach a particular image for the portion of the replication it maintains. As well, bookmarks may also be created on user demand.

Journal

For a replicated volume or volumes, the journal for the replication may be striped across each grid copy. The journal volumes may create a virtual striped space, each grid copy may get specific portions of the space, on which the grid copy may handle its journal. As well, the journal of each grid copy may manage its own list of snapshots. Referring back to FIG. 5A, the Virtual Consistency group 500 has a virtual journal 520. The virtual journal 520 may he made up of the journals 535, 545, 555, and 565 of the grid copies 530, 540, 550, and 560. Referring again to FIG. 5A, each grid copy nay maintain a journal which corresponds to a segment of the virtual journal.

Figure 9:
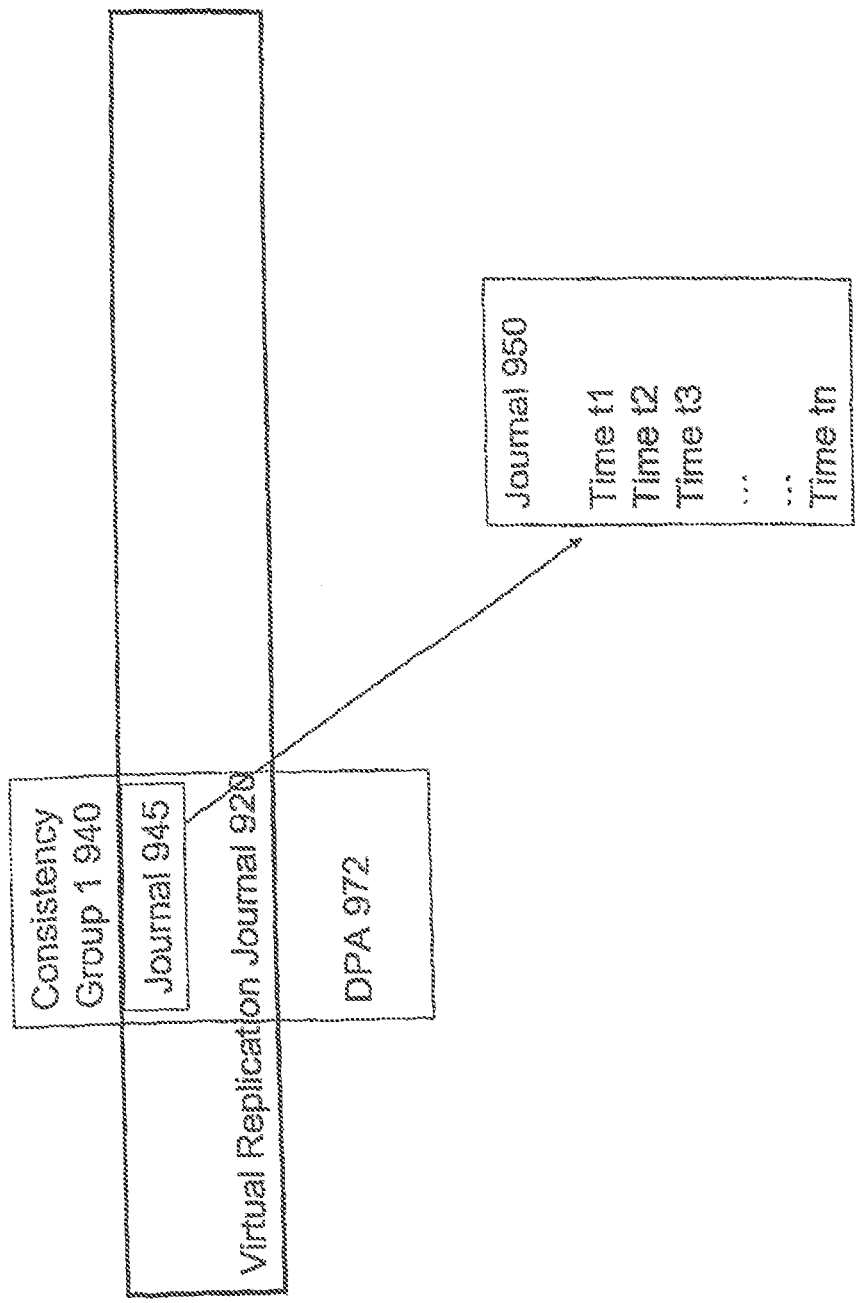
FIG. 9 is a block diagram of a time stamps on the journal of a grid copy.

Referring to FIG. 9, each journal, such as journal 950, on a grid copy, such as grid copy 940, may keep track of time increments for the journal. This allows each grid copy to roll the replication image forward and backward to reach a particular image. In some examples, when all grid copies of a virtual consistency group rolls the image back to a particular point in time Tz, the virtual consistency group may present the image of the replication for the virtual consistency group at time Tz. In sonic examples, the timestamps may be maintained within the journal do and undo streams.

Initialization

The initialization process may he independent for each grid copy of the Virtual Consistency group. Each grid copy may perform the initialization at a different rate, depending on the resources present on the appliance on which the grid copy is running. In some examples, each grid copy may have partial release information for each copy in the delta marking. The partial release information may denote the status reached in the initialization for that grid copy. If the initialization were to fail or crash, when the initialization is restarted, the copy may use the partial release information to resume the initialization from the point it reached before failure.

Figure 11:
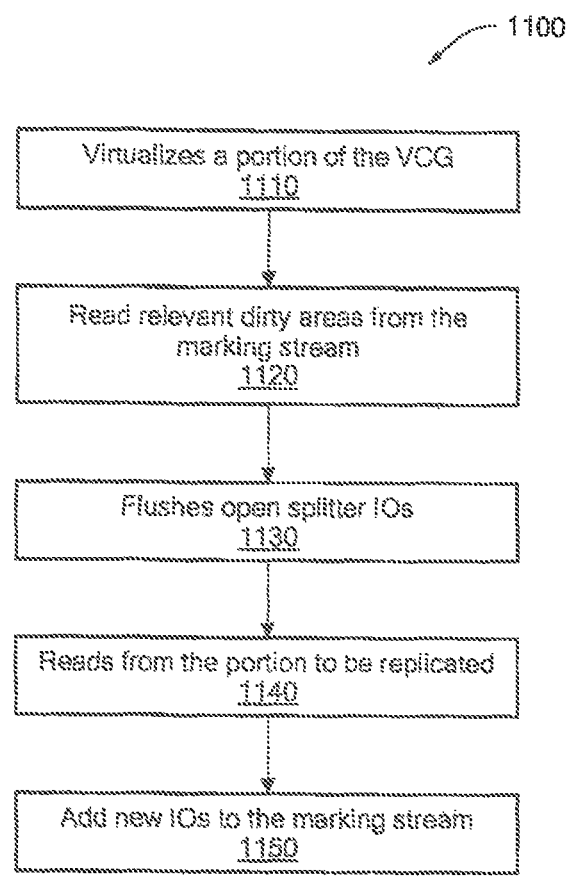
FIG. 11 is a flowchart of an example of a process to perform initialization.

Referring to FIG. 11, initialization (e.g., a process 1100) may have each grid copy virtualizes 1110 the area it is responsible for replicating. For example, if a single volume is being replicated, this volume may be split between the number of grid copies, where each grid copy may receive an equal amount of the volume to replicate. If there are two grid copies, each grid copy may get half the volume, if there are four grid copies, then each grid copy may replicated one fourth of the volume. If there are multiple volumes or consistency groups to be replicated, then each the information to be replicated may still be divided between each of the grid copies.

In one example, each grid copy may read 1120 the relevant dirty areas from the marking stream of grid copy zero, for the portion of the volume or volumes it is currently synchronizing. The marking stream may contain the portion of the replication that has changed and needs to be updated. As well, each grid copy may just read the portion of the marking stream that corresponds to the portion of the replication which it is replicating.

In some examples, each grid copy may flush 1130 open splitter IOs, so that all newer IOs will reach the grid copy while initializing. This will enable each grid copy to know all the dirty portions of the replication. In further examples, after the flushing is done, the grid copies may start reading 1140 local volumes independently from grid copy zero.

In another example, new IOs may be added 1150 to the marking stream of copy 0. In other examples, the partial release info may he saved per grid copy as the initialization progresses and may includes the virtual location reached during the initiation process and what location was reached in the marking stream.

Take an example, where an initialization was occurring and there were only 2 consistency groups in the virtual consistency group. In this example, consistency group 0 had processed 60 percent the initialization while Consistency group 1 had processed 20 percent of the of the initialization task. When the initialization is restarted, consistency group 0 may continue where it left off using the partial marking and need no processes the 60 percent that it had already processed. As well, consistency group 1 may start processing at the remaining 80 percent that it has not yet processed. In addition, since the crash, new IO may have been recorded. Each consistency group will recognize and process this additional IO as well. The partial release may have two dimensions: the point up to which the marking stream has completed the init and the portion of the volumes completed, the partial release info may contain several points for each CG.

Figure 10:
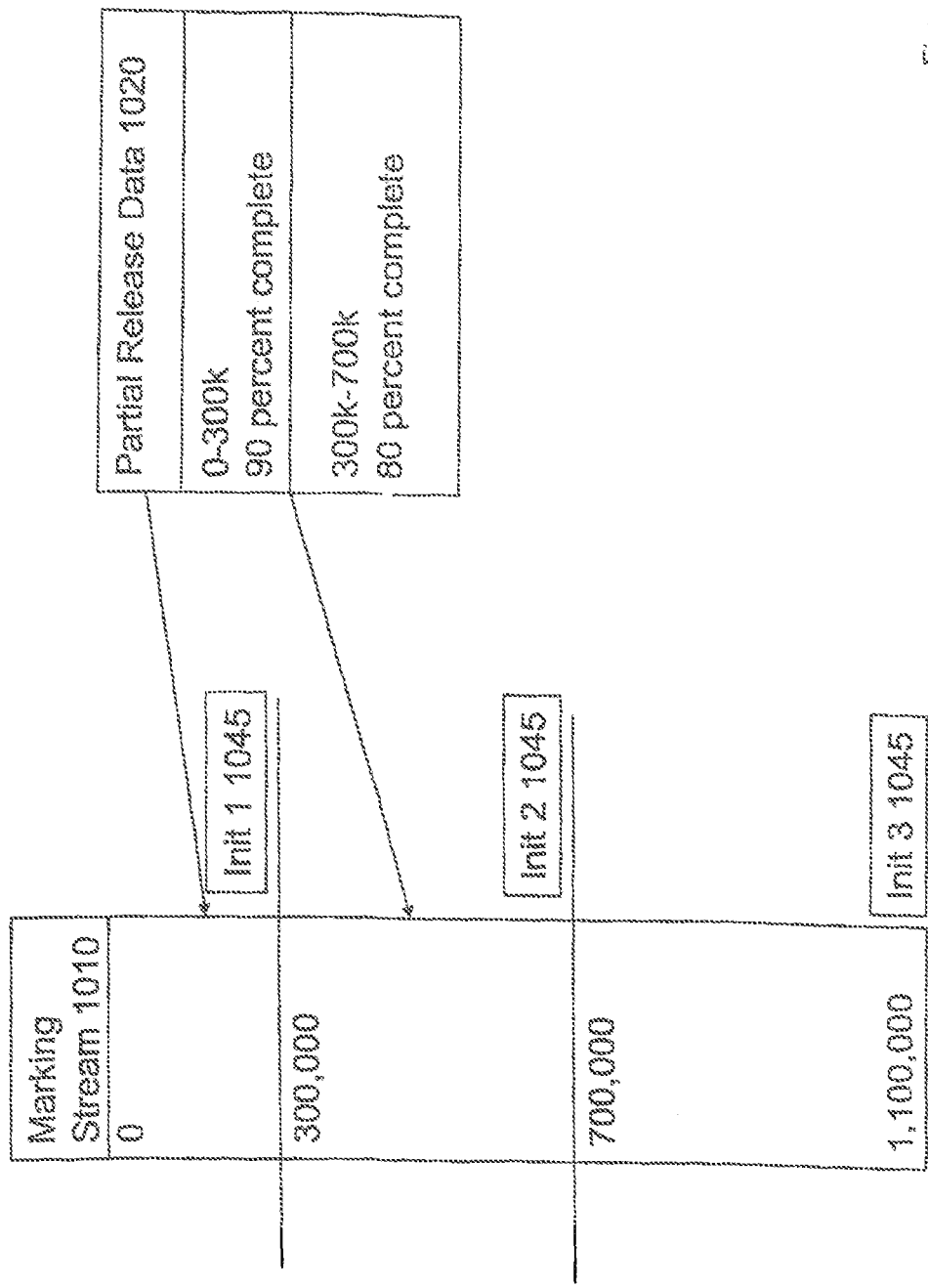
FIG. 10 is a block diagram of partial release data.

Referring to FIG. 10, during a first initialization, the partial release info may indicate that the initialization completed 90% of the volume until entry 300,000. During a second initialization 80% may have been completed until entry 700,000. During initialization 2, the dirty entries from the marking stream 1010 may be read, each entry in the first 300,000 which is in the first 90% of the volume will be ignored. During an initialization 3, each entry which is in location 300,001 to 700,000 which is in the first 80% of the volumes will be ignored, all entries from 700,001 will be sent to replica.

The partial release info 1020 may contain a list of pairs, the size of the list is up to the number of times the initialization failed to complete. In the first initialization, which finished 90% when it crashed, the number of entries at the time of the crash was around 300,000 (the 90%, 300,000) is what may have been acknowledged. The second initialization ignored IOs in the first 300,000 entries of the marking stream which are to the first 90% offset of the volumes replicated. The second init completed 80% and the number of entries during the crash was 700,000. There may have been more marking entries, but acknowledgements were received for synching 80% of the first 700,000. A further initialization may have been started and reached 85% completion.

The entry list is for these three initializations may be 1. 90%, 300,000, 2. 80%, 700,000, and 3. 85%, 1,100,000. Entry 3 may mean that all entries which are in the first 1,100,000 entries, which offset is less then 85% of the volume can be ignored, which include entry 2, but not cover all entry 1, if for instance the last init got to 91%, then entry 1 may also be obsolete.

Image Accessing

Figure 13A:
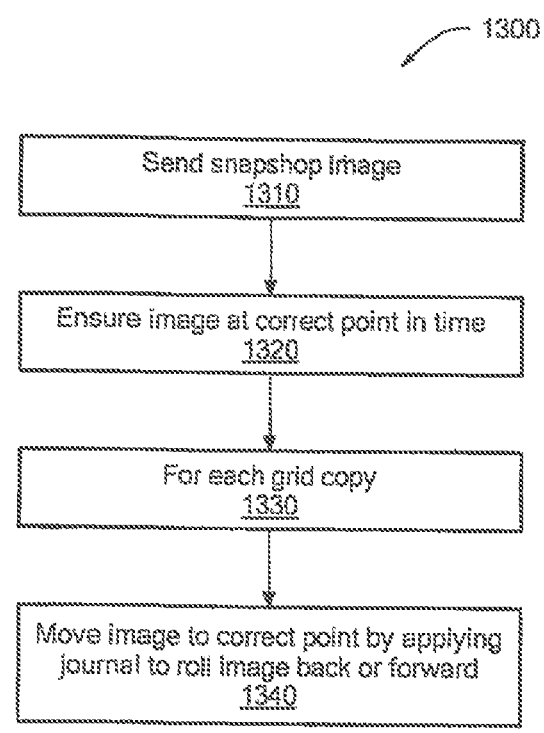
FIG. 13A is a flowchart of an example of a process to save and access a point in time snapshot.

In some examples, to access an image of the virtual consistency group, each grid copy may need to create an image the same point in time. Referring to FIG. 13A, for a process 1300, a snapshot message may be sent 1310 to all grid copies. Each grid copy may ensure 1320 that it is at the same correct point of time to create a consistent remote image. In some examples, accessing a point in time may require that each grid copy 1330 roll the image to the appropriate bookmark in the journal of the grid copy 1340.

After the image is created, user may access the volume in virtual or logged access mode In one example, the image and the access point may be created in logged accessed mode, where mode read IOs may be sent from the directly to the volume, while write IOs may be sent to grid copy zero, which will forward the IO to the correct grid CG or split the IO to several parts sending them to the relevant Grid CGs, if IO corresponds to areas in the volume handled by more than one grid CG. When IO handling is completed the grid copy (i.e., the undo data of the IO was written to the logged access undo journal) may tell grid copy zero that IOs completed and grid copy may return the SCSI status command to the splitter which will be able to complete the IO, if the IO was split to several grid copies, the status will be returned when each grid copy completes handling the IO.

In virtual access mode both reads and writes of the volume may be redirected to grid copy zero, which may redirect the IO to the correct grid copy, which may complete the IO, acknowledge grid copy zero, which may return the SCSI status back. In some examples, one IO may be split to several IOs, if the IO is to locations which are handled by more then one grid copy. For example if the grid stripe length is 1 MB, and IOs with size more than 1 MB arrived, the IO may be split to more then one grid copy. Also an IO of size of two blocks may be split if it is written to a boundary between grid copies The status command in target side processing (TSP) and in the virtual mode may also be achieved by a bound, since many IOs may arrive from the splitter in parallel. In the access mode, the DPA may give each logged/virtual access IO a timestamp. A status of the IO may be returned when the IOs with lower timestamps are completed; otherwise the status command will be delayed.

Bookmarks

For example, using a 1 second granularity a message be send for every second, and each grid copy may place a bookmark in the journal copy corresponding to this point in time. When a request for a particular point in time is received, the grid copy may create an image for this request by rolling forward or backward in the journal based on the point.

For example, referring back to FIG. 10, it is desired to have an image from time T=2. This may mean it is necessary to have each consistency group roll the image either forward or backward in time to create an image at time T=2. In FIG. 10, time T=2 has been highlighted and all consistency groups may apply the journal streams to arrive at time T=2.)

Snapshot List

The DPA may hold a list of n selected snapshots, where n-1000. As there may be many grid copies in the virtualized CG, each grid copy may hold a different list of 1000 snapshots. The presented list of snapshots may be the intersection of the list of snapshots of all the grid copies. This may be because the list of 1000 snapshots is a selected list and it may be necessary to make sure the selection algorithm of each copy works the same. During a disaster, a message may arrive at one grid copy and not another. In this case, it may not be assumed that the lists are identical.

Figure 13B:
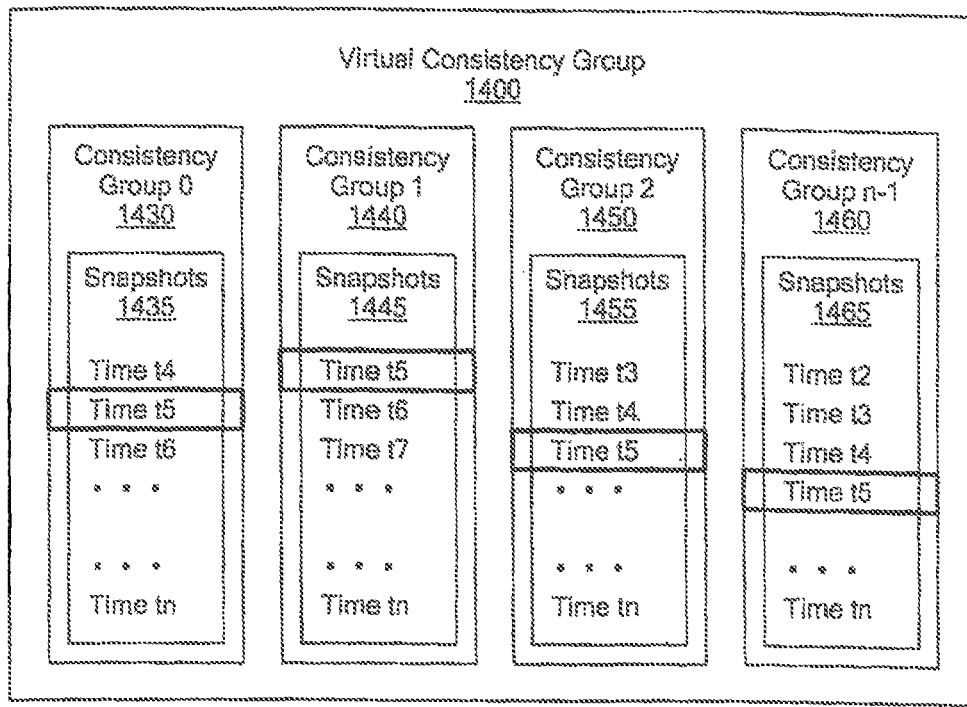

Referring to FIG. 13B, the lists of the snapshots 1435, 1445, 1455, 1465, may not be identical and a smart selection algorithm exist may be applied. Each snapshot may get a snapshot ID, which may be an integer.

In some examples, the selection algorithm may keep the snapshot list with at most 1000 entries. When a new entry arrives, the selection algorithm may remove one entry from the list. The entry that may be removed may be the one with the lowest priority. In some examples, user bookmarks have the highest priority. In other examples, a system bookmark with odd bookmark IDs may have the lowest priority than snapshots with even ID not dividable by 4, than not dividable by 8; this type of deletion may maintain an equal distance between bookmarks. In some examples, if all the bookmarks have the same priority, selection may be made to ensure that the distance between bookmarks in terms of data is almost the same; that the delta between bookmarks is minimized. In other examples, it may be stated that the 10 bookmarks most recent bookmarks may not allowed to be diluted.

Accessing Volumes in a Rollback

In some cases, a user starts in the virtual access mode, where the user volumes are not updated to the point in time the user created. The virtual image is a set of pointers. For every block in the volume, the pointer points either to the user volume or to a location in the journal. In a distributed CG environment for some virtual CGs the user volume may be more updated than the image the user requested. Thus, the pointers will point to the UNDO stream and the user volume. For some virtual CGs, the user volume has less updates than the image the user requested. Thus, the pointers will point either to the DO stream or to the user volume.

If the user requests a background process, the system can roll back the user volume to the current point the user is accessing, allowing the user to move to the logged access mode. This is required if a user wants to failover the image to the production site. While in the virtual access mode, new write IOs arriving in the virtual access mode are written in the virtual access DO stream. The background process will first roll IOs from the regular DO or UNDO stream to the user volume, then the user volume will be at the point in time the user originally asked. However, the user has created new writes IOs since he mounted the virtual image and these new write IOs are in the virtual access DO stream. The background process will then move the IOs from the virtual access DO stream to the logged access UNDO stream by applying them to the volume. If all IOs are applied, then the group can move to the logged access mode, where for each new IO, the UNTO data for this IO is tracked in the logged access UNDO stream.

Figure 14A:
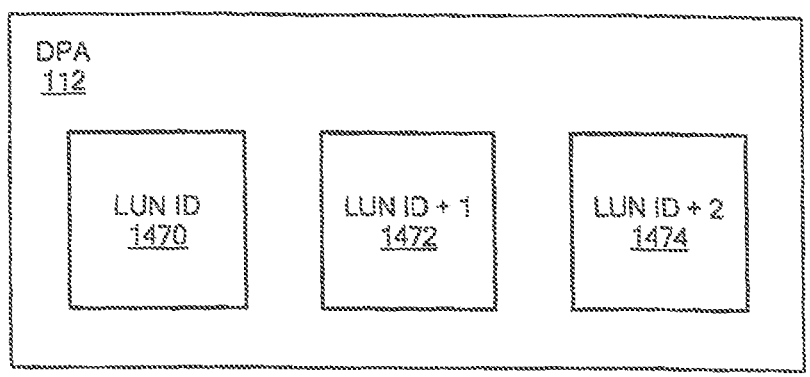
FIG. 14A is a block diagram of an example of a data protection appliance with service volumes.

Referring to FIG. 14A, while in virtual or logged access mode the DPA (e.g., the DPA 112) exposes a service LUN (e.g., a first service storage volume 1470 (LUN ID), a second service storage volume 1472 (LUN ID±1), a third service storage volume 1474 (LUN ID+2)and so forth), which is a SCSI target logical unit like a storage array, to the splitter 775 where all IOs are received, the DPA may expose one service LUN per distributed CG, or one LUN per replicated user volume (independent of the number of virtual CG copies). As used herein, LUN ID, LUN ID+1 and LUN ID+2 refer to LUNs that are distinct from each other. They could also be referred to interchangeably herein as the first service volume 1470, the second service volume 1472 and the third service volume 1474 respectively. In particular, these are the service LUNs the DPA exposes, to the splitter 775, to obtain the use IOs while in virtual or logged access mode. For example, the splitter 775 forwards IOs from volumes in the distributed CG to these service LUNs in the data protection appliance depending on the access mode.

Figure 14B:
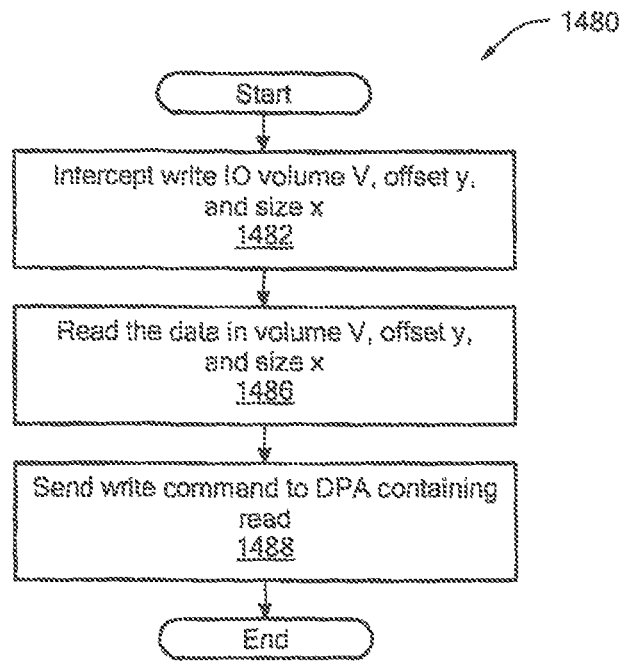
FIG. 14B is a flowchart of an example of a write IO flow using the splitter in a logged access mode.

Referring to FIG. 14B, a process 1480 is used to describe IO flow in the logged access mode. In one example, the process 1480 is used by the splitter 775. The process 1480 intercepts a write IO for a volume V that is offset y blocks (e.g., offset y blocks from the beginning of the volume) and has a size of x blocks (1482). Process 1480 reads the data in the volume V, offset y and size x (1486). Process 1480 sends a write command to the DPA including the data read in processing block 1486 (1488).

Figure 14C:
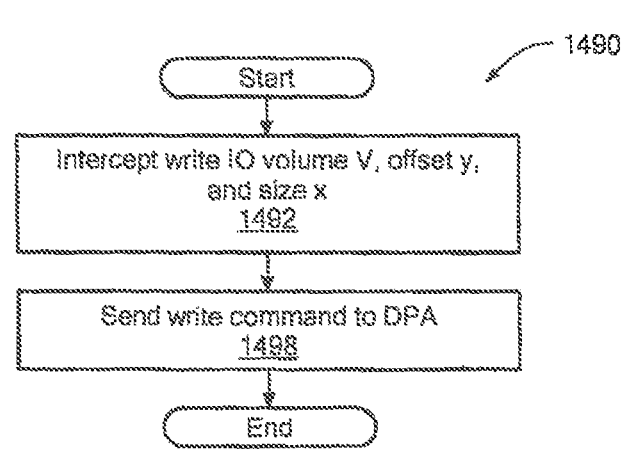
FIG. 14C is a flowchart of an example of IO flow for a write IO using the splitter in a virtual access mode.

Referring to FIG. 14C, a process 1490 is used to describe write IO flow in the virtual access mode. In one example, the process 1490 is used by the splitter 775. The process 1490 intercepts a write IO for a volume V that is offset y blocks and has a size x blocks (1492). As used herein, a volume is an array of blocks, e.g., a block size in a storage array is 512 bytes.

Process 1490 sends a write command to the DPA (1488). For a virtual access read, the process the splitter 775 would perform is the same process as a process 1850 in FIG. 18B.

It has been found that with grid or distributed CGs, a move from the virtual access mode to the logged access mode is more complicated in maintaining data integrity since there are several copies to track and new IOs may be generated during the transition. In particular, during a roll back not all of the copies have completed a roll back before a new IO has been generated. As described herein, one solution is to use a centralized manager (e.g., the central manager 780) to track the roll back of each virtual CG as described in conjunction with FIGS. 15A, 15B and 16. Another solution is to use the splitter (e.g., the splitter 775) as described in conjunction with FIGS. 17A to 19B along with the central manager 780.

Figure 15A:
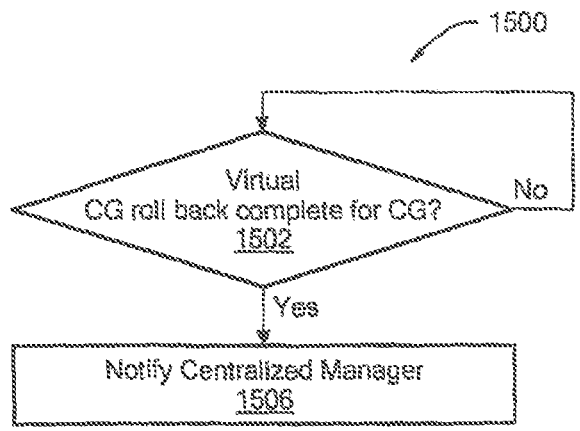
FIGS. 15A, 15B and 16 are flowcharts of an example of a process to more to a logged access mode from a virtual access mode.

Referring to FIG. 15A, a process 1500 is performed by the virtual CGs. The process 1500 determine if a virtual CG has completed its roll back (1502). If not, process 1500 keeps checking by repeating processing block 1502. If the roll back of the virtual CG is complete, the central manager 780 is notified (1506). In another example, the central manager 780 may be notified that a roll back is almost complete, e.g., there is less than n MB left to complete the roll back where n can be 50 MB, for example.

Figure 15B:
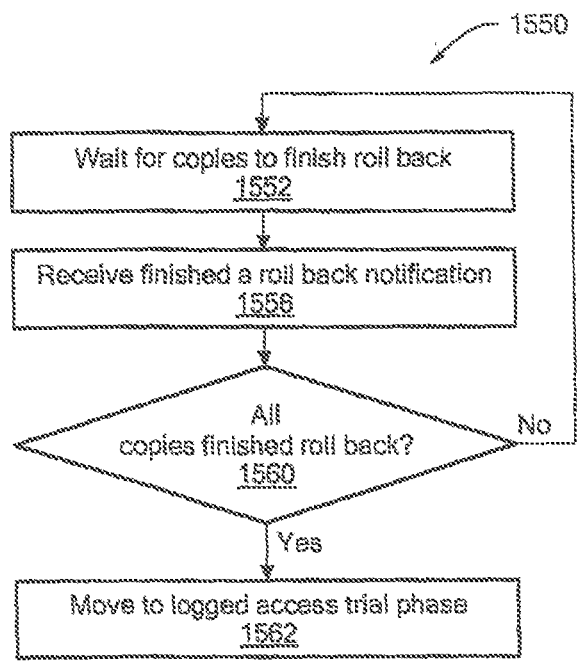

Referring to FIG. 15B, a process 1550 is performed at the central manager 780 (FIG. 7). Process 1550 waits for all virtual CGs to complete their roll back (1552) and receives a notification from each virtual CG (1556). Process 1550 determines if all of the virtual CGs have rolled back (1560). If not all of the virtual CGs have completed a roll back then processing blocks 1552, 1556 and 1560 are repeated. If all of the virtual CGs have completed their roll back then process 1550 moves to a logged access trial phase (1562).

It is important to note that even after the roll back is completed for a particular virtual CG, it may became incomplete again if new IOs are received for that virtual CG. These new IOs are written to the virtual access DO stream (e.g., in the replication journal 720). The background process will roll these new IOs from the virtual DO stream to the logged access UNDO stream.

Figure 16:
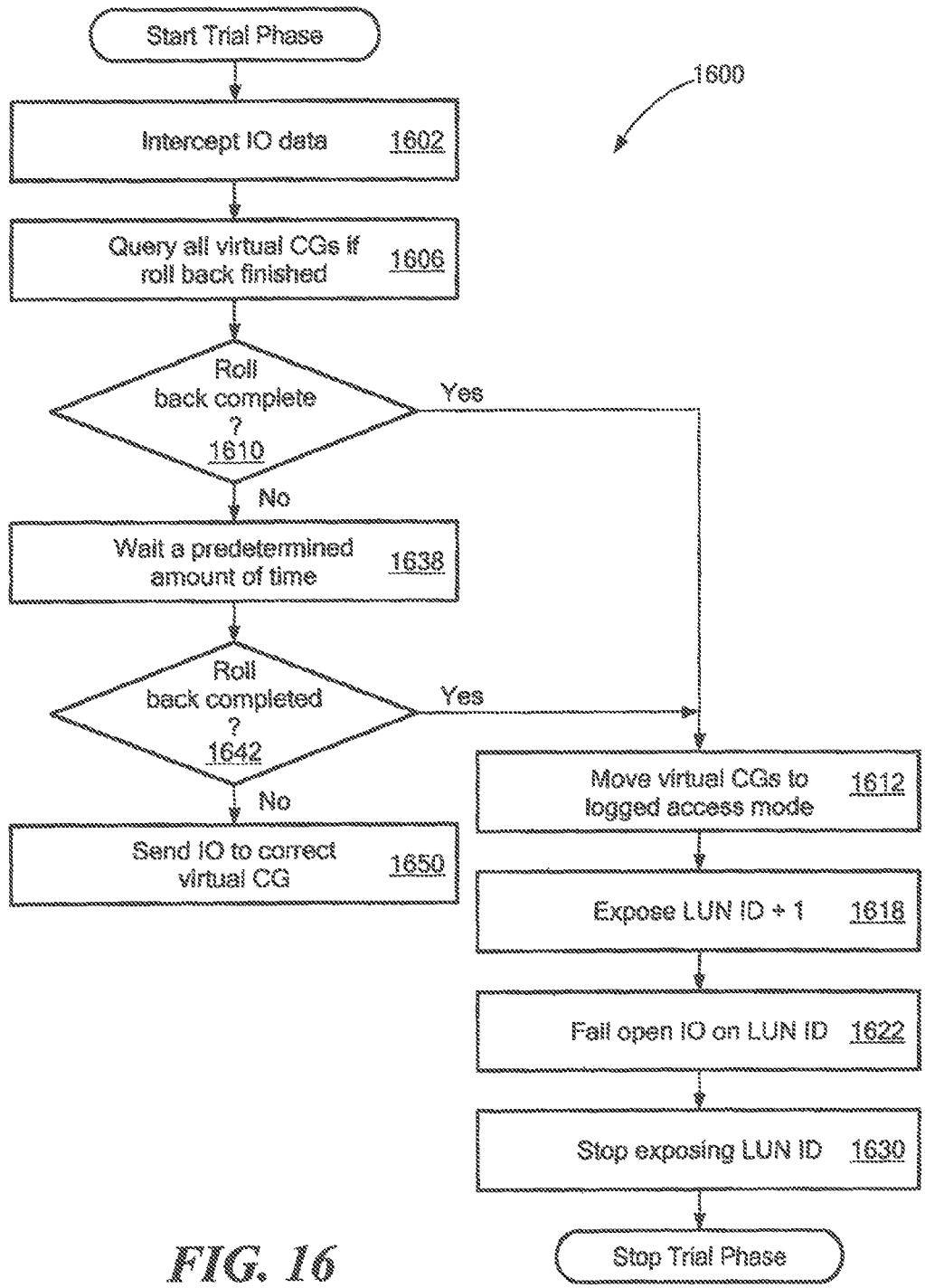

Referring to FIG. 16, a process 1600 is a trial phase to determine if the system is ready to move to the logged access mode. In one example, the central manager 780 performs the process 1600. The process 1600 intercepts IO data such as a read IO or a write IO (1602) received from the splitter 775. The process 1600 queries all virtual CGs if roll back is finished (1606). The process 1600 determines if the roll back is complete for all CGs (1610), while still holding the IO.

If the roll back is complete, the process 1600 moves all virtual CGs to the logged access mode (1612) and exposes (i.e., makes available) a LUN ID+1 (1618). Process 1600 fails open IOs on the LUN ID (1622) and stops exposing (i.e., stops making available) the LUN ID (1630).

If the roll back is not complete, the process 1600 waits a predetermined amount of time (1610). In one example, the predetermined amount of time is 100 or 200 milliseconds. Process 1600 will determine again if roll back is completed for the virtual CGs (1642). If the roll back is complete, the process 1600 moves the virtual CGs to the logged access mode. If the roll back is not complete, the process 1600 sends the IO to the correct virtual CG (1650). The correct virtual CG is determined by the offset of the IO as described above (if the IO is across boundaries of two or more virtual CGs, the IO will be split to several IOs. Each IO is sent to the correct virtual CG and when each of the IOs are completed, then the return status is sent to the splitter 775).

FIGS. 17A to 19B describe a more complex example of transitioning to the logged access mode, However, in this example, IOs are not held (i,e., delayed) as in processing block 1638 (FIG. 16), for example, thereby adding faster less disruptive transition from virtual to logged access modes.

Figure 17A:
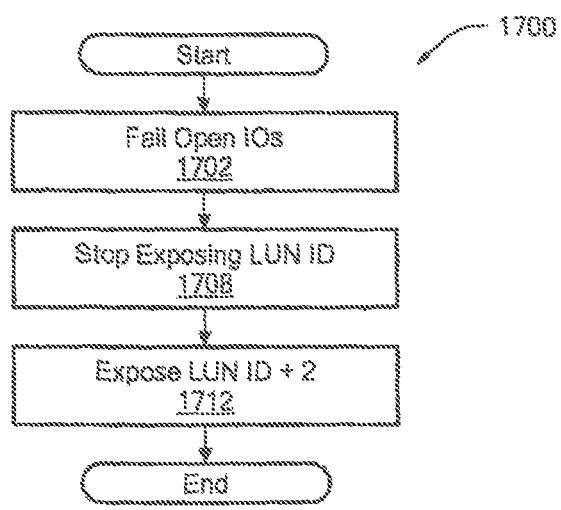
FIGS. 17A, 17B, 18A, 18B, 19A and 19B are flowcharts of another example of a process to move to the logged access mode from the virtual access mode.

Referring to FIG. 17A, a process 1700 fails all open IOs (1702) and stops exposing the LUN ID (1708). Process 1700 exposes LUN ID+2 (1712).

When the DPA performs process 1700, for example, the splitter IOs will fail. The splitter 775, for example, performs a process 1750 to recover and move to the next stage.

Figure 17B:
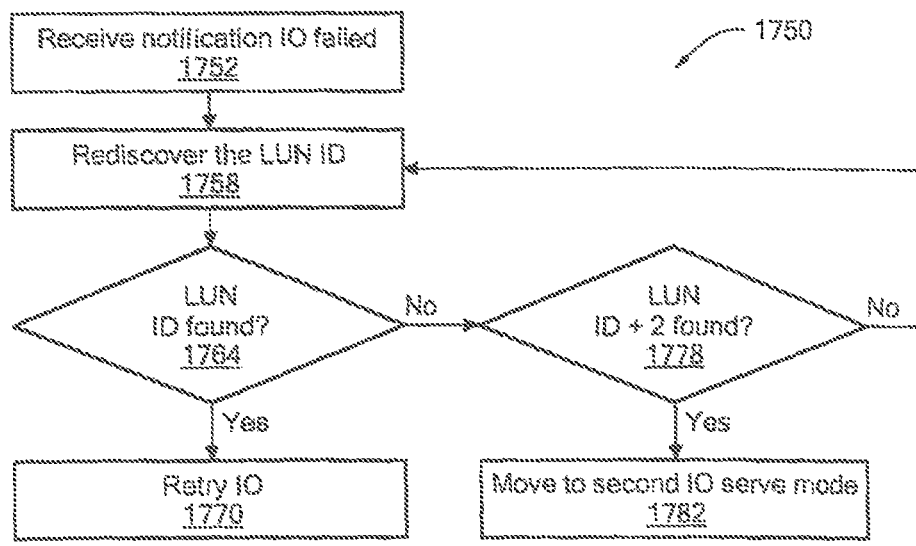

Referring to FIG. 17B, in one example, the splitter 775 performs a process 1750. Process 1750 receives notification that the IO failed (1752). For example, from processing block 1708, the LUN ID is no longer available. Process 1750 attempts to rediscover the LUN ID (1758). The process 1750 determines if the LUN ID is found (1764). If the LUN ID is found, the process 1750 refries the IO (1770). If the LUN ID is not found, the process 1750 will try to find the LUN ID+2 since, from process block 1712, LUN ID+2 may now be available. If the LUN ID+2 is not found, then the process 1750 performs processing block 1758 again. If the LUN ID+2 is found, then the process 1750 moves to a second IO serve mode (1782). The second IO serve mode is a mode where IOs are handled as described in FIG. 18A.

Figure 18A:
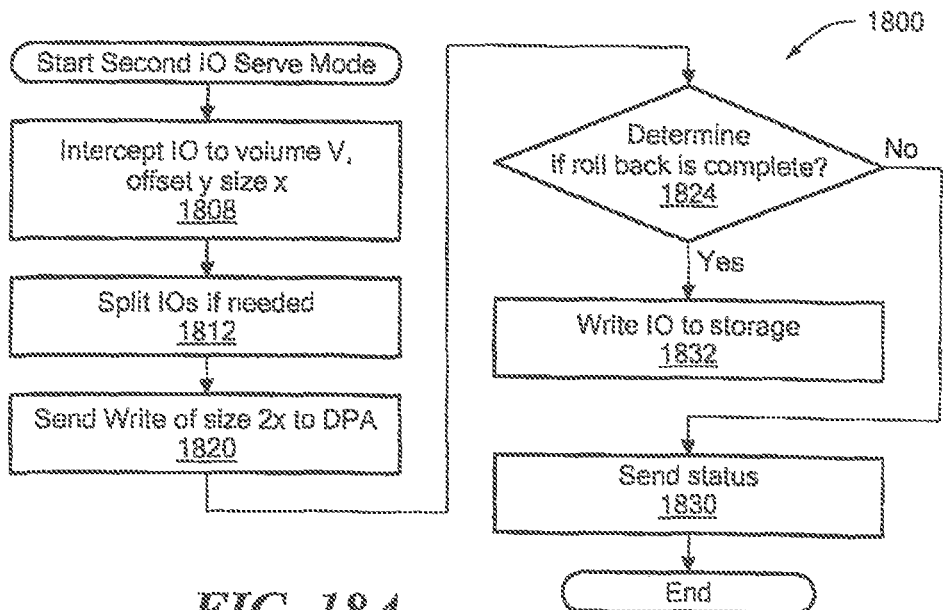

In one example, FIG. 18A describes how the splitter 775 handles write IOs received, when the splitter 775 is in the second IO serve mode using a process 1800. In particular, the splitter 775 intercepts IOs to the volume, V, offset by y blocks (e.g., offset y blocks from the beginning of the volume), and a size of x blocks (1808).

The splitter 775 determines if the IO crosses virtual CG boundaries and, if so, splits the IO into several IOs (1812). In one example, the virtual CGs slice the volumes to 2048 block slices, so IO to block 2000 of size 100 bytes, crosses the boundaries, and will be split into two IOs: (1) offset 2000 blocks and length 48blocks, (2) offset 2048 blocks, length 52 blocks.

The splitter 775 sends write IOs that are twice the size of x or 2x to the DPA (1820). One half of the 2x size, is used for new data that is written. The other half of the 2x size includes the current value in storage at the offset y. For example, the IOs are sent to the service LUN (volume) exposed by the DPA, and include the IO metadata (e.g., volume, offset, size and so forth)).

In the above example, the splitter 775 will send the DPA two IOs: one to volume V, offset 2000 of size 96 (48*2) blocks, and the other one to offset 2048 blocks of size 104 blocks (i.e., a volume is an array of blocks, e.g., a block size in a storage array is 512 bytes) (2*52).

Based on a status code the DPA returns, the splitter 775 determines if the roll back for the CG relevant for the IO sent completed the roll (e.g., the DPA returns a vendor specific status code). In this case, the splitter 775 will write the IO to the storage. Or if the roll back is not completed (e.g, the DPA returns a status OK return code) in which case the splitter 775 does nothing else.

In the example above, assuming the virtual CG, which should handle the IO to offset 2000, completed the roll back, the DPA will return vendor specific status, and the splitter will write the 48 blocks of the IO to the storage.

If the virtual CG responsible to the IO in offset 2048 did not complete the roll back, the DPA will return the OK status and the splitter 775 will not write the user data to the storage since the virtual CG added the IO to the virtual access DO stream.

Figure 18B:
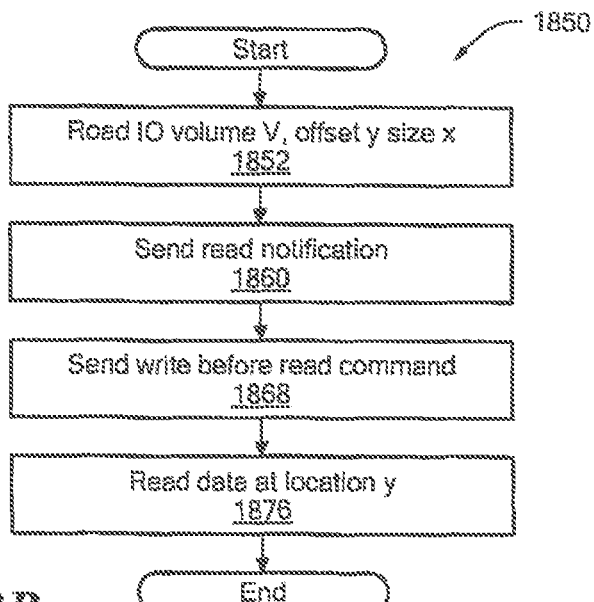

FIG. 18B describes a read flow in the second IO handling mode which is identical to the read flow in virtual access mode. A process 1850 obtains a read request to a volume V that is offset by y blocks and has a size x blocks (1852). The process 1850 sends a read notification of the read (1860)to the DPA including the offset, the size, and the volume ID. When acknowledged, the process 1850 will send a write-before-read command including data in offset y on the disk of size x (1868) to the DPA. The process 1850 will forward the read request itself to the DPA. In one example, the process 1850 is performed by the splitter 775. The above process is used when the splitter 775 runs inside the storage array, because the DPA cannot read the data at the offset y if another user is currently uses the same data, because a deadlock will occur.

Figure 19A:
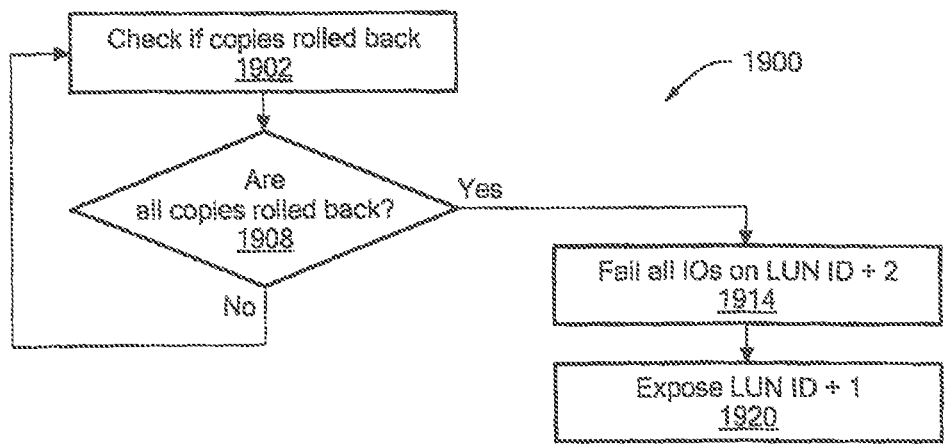

Referring to FIG. 19A, a process 1900 checks (e.g., periodically) if all copies have rolled back (1902). If all the copies have rolled back, then process 1900 fails all IOs on LUN ID+2 (1914) and exposes LUN ID+1 (1920). In one example, the process 1900 is performed by the central manager 780 (FIG. 7).

Figure 19B:
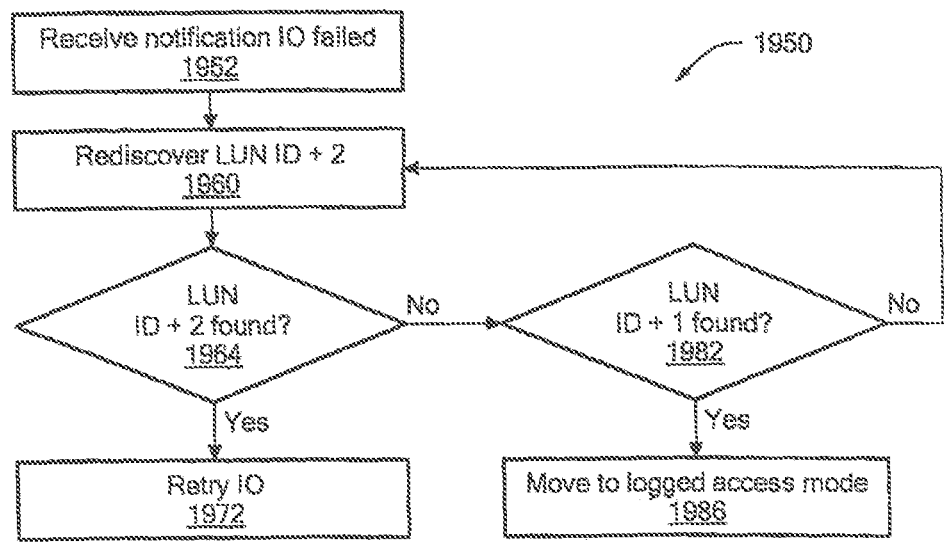

Referring to FIG. 19B, in one example, the splitter 775 performs a process 1950. Process 1950 receives notification that an IO has failed (1952) and attempts to rediscover LUN ID+2 (1960). Process 1950 determines if the LUN ID+2 has been found (1964). If the LUN ID+2 has been found, the process 1950 retries the IO (1972).

If the LUN ID+2 has not been found, the process 1950 determines if the LUN ID+1 has been found (1982). If the LUN ID+1 has been found, the process 1950 moves to the logged access mode (1986). If the LUN ID±1 has not been found, the process 1950 repeats processing block 1960.

Splitting Data

As previously described the data protection agent may be located anywhere within system 100. In one example, a data protection agent 2000 is located at the source-side storage 108. As described further herein, the data protection agent 2000 may be further modified to become aware of the virtual consistency groups. In particular, the data protection agent 2000 knows which grid copy runs on which appliance and knows how many grid copies there are.

In addition, one option, to leverage virtualized CG is to have more symmetry between the grid consistency groups. In particular, instead of having grid copy 0 handling all the IOs, the grid copies as a whole are responsible for handling the IOs for the volumes of the CG and each grid copy handles the volume portions which it has responsibility. In one example, if there are two grid copies and one logical unit (e.g., a LU 1) a grid copy 0 may handle some of the IOs arriving to LU 1, while grid copy 1 may handle remaining IOs to LU 1 depending on the offset of the IO. While the examples used herein include two grid copies one of ordinary skill in the art would recognize that any number of grid copies may be used. In one example, one virtualized CG may handle any number of LUs. In another example, each LU may he treated similarly to LU 1.

Figure 20:
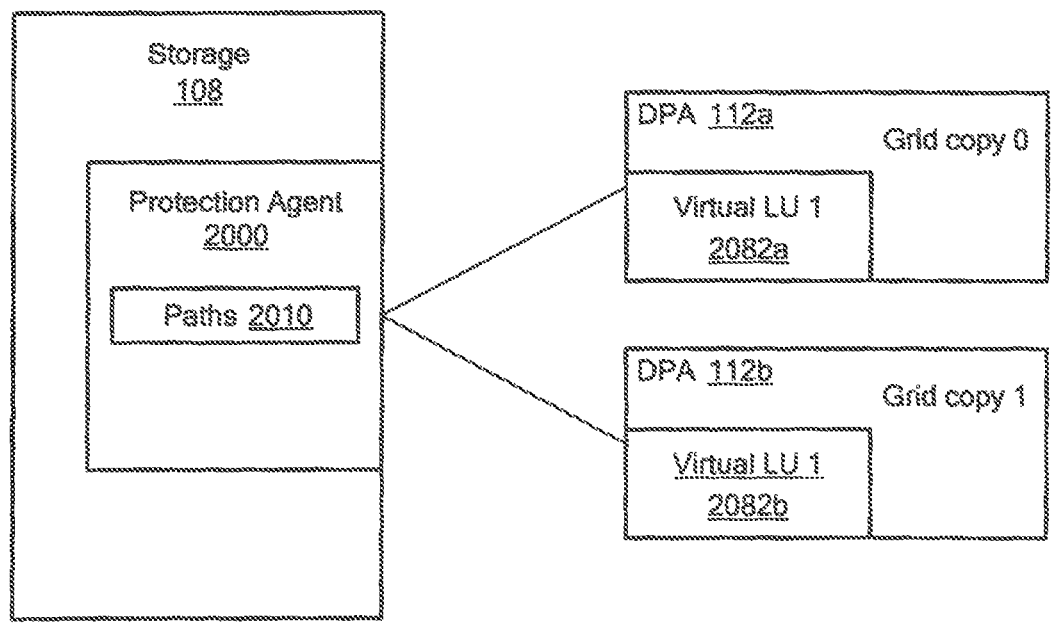
FIG. 20 is a block diagram of a protection agent and data protection appliances.
Figure 21:
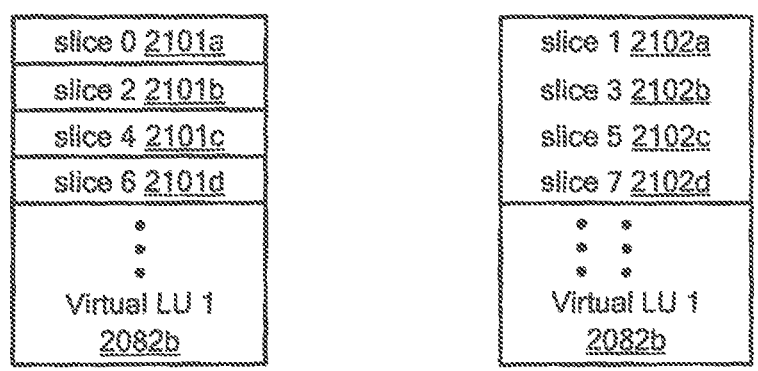
FIG. 21 is diagram of logical unit with slices.

Referring to FIGS. 20 and 21, the source side data protection agent 2000 (e.g., a splitter) sends IOs to one or more DPAs (e.g., a DPA 112a and a DPA 112b). The data protection agent stores paths 2010 to each of the grid copies. In one example, a virtualized grid consistency group replicates LU 1.

In one example, LU 1 is divided into portions according to the number of the grid copies, for example, one portion of a LU 1 2082a and another portion of the LU 1 2082b (in the case when there are two grid copies). In particular, a grid copy 0 runs on the DPA 112a and the DPA 112a is configured to receive splitter IOs for LU 1 2082a. The data protection agent (splitter) 2000 intercepts IOs for LU1 (the data protection agent 2000 receives IOs to the LUN on the storage). If the IO is to the portion 2082a, the data protection agent 2000 will write it to DPA 112a. The DPA 112a exposes a special target device which intercepts this target IO. The special target device is not LU 1, but a special device that accepts splitter IOs to portions of LU 1 2082a. After the DPA 112a acknowledge the IO the data protection agent 2000 will send the IO to the storage array and then the IO processing is determined to be complete.

Grid copy 1 runs on the DPA 112b and the DPA 112b is configured to receive splitter IOs for LU 1 2082b. In some other examples, grid copy 0 and grid copy 1 may run on the same DPA, for example, DPA 112a. In this case DPA 112a will be configured to receive all splitter IOs to LU 1. The protection agent 2000 discovers LUs 2082a, 2082b, and discovers to which DPA it has to forward IOs for each LU.

Referring to FIG. 21, in one example, a LU 1 may be divided into slices (e.g., slice 0, slice 1, slice 2, slice 3, and so forth). The LU may be saved as two virtual LUs (e.g., virtual LU 1 2082a and virtual LU 1 2082b). For example, the virtual LU 1 2082a includes a slice 0 2101a, a slice 2 2101b, a slice 4 2101c, a slice 6 2101d and so forth (slice 2n-2), the virtual LU 1 2082b includes a slice 1 2102a, a slice 3 2102b, a slice 5 2102c, a slice 7 2102d and so forth (slice 2n-1) and each slice has a predetermined number of blocks. In one example each slice has 2048 blocks. In one example, slices 2101a-2101d, 2102a, 2102d are each 1 MB (2048 blocks). In other examples, IOs that Cross slice boundaries 2101a-2101d, 2102a-2102d are split by the protection agent 2000 according to slice boundaries and each IO is send to the DPA running the grid copy responsible for the slice.

The data protection agent 2000 knows which DPA is preferred for each slice and will try to write to the preferred DPA. The DPA accepts IOs to the LU if it is handled by the DPA. If the data protection agent 2000 sends the IO to the wrong DPA it will receive an IO failure and the data protection agent will try to write to another DPA until it finds the correct DPA.

Figure 22:
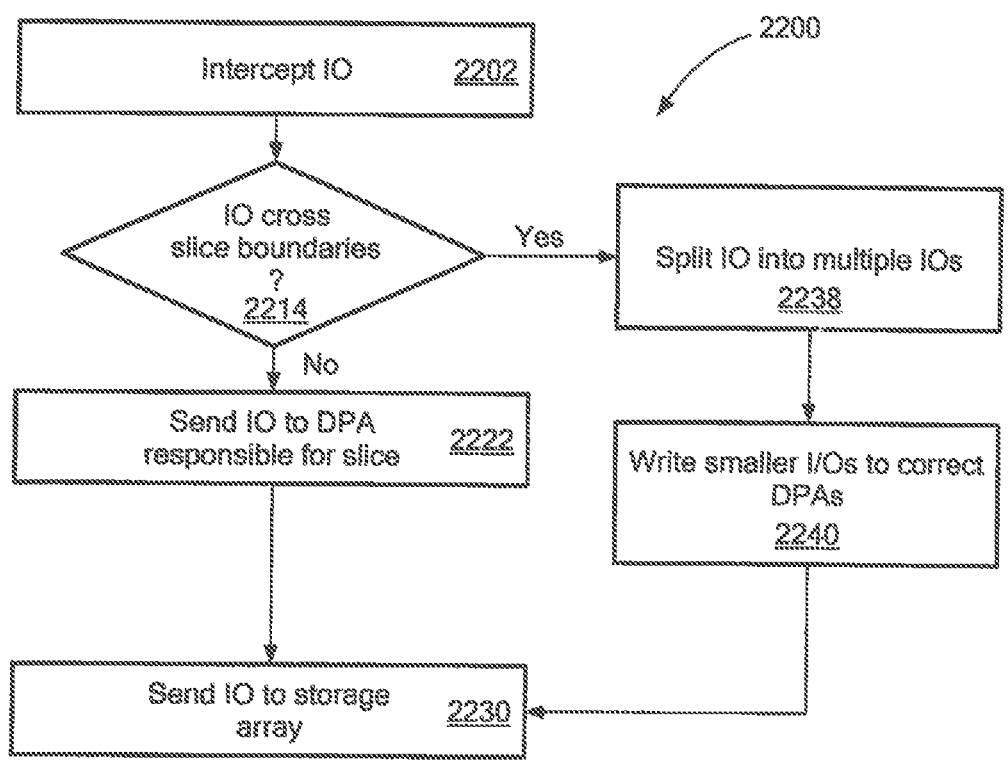
FIG. 22 is a flowchart of an example of a process to manage IOs.

Referring to FIG. 22, an example of a process to manage write IOs at the protection agent 2000 is a process 2200. Process 2200 intercepts an IO (2202) to LU 1. Process 2200 determines if the IO crosses slice boundaries (2214). If the IO crosses slice boundaries, process 2200 splits the IO to multiple smaller IOs (2238), writes the smaller multiple IOs to their correct DPA based on the paths 2010 (2240), alter the DPAs acknowledge the IO the protection agent sends the complete IO to the storage array (2230).

If an IO does not cross slice boundaries process 2200 send the IO to the DPA responsible for the slice based on the paths 2010 (2222). After the IO is acknowledged, the process 2200 sends the IO to the storage array (2230). For example, an IO to offset 1000 of size 10 blocks, will be sent to the DPA running grid copy 0, since it is just to slice 0. When the DPA acknowledges the IO, the IO will be sent to the storage array.

In another example, the data protection agent 2000 intercepts an IO to offset 2000 of size 100 blocks. The data protection agent 2000 will send an IO of offset 2000 size 48 to DPA running copy 0, and an IO to offset 2048 size 52 to DPA running copy 1, after both DPA acknowledge the IO the IO of offset 2000 and size 100 blocks will be send to the storage array.

In one example, after receiving an IO, each DPA will handle the IO, send the IO to the remote DPA handling the grid copy and the remote DPA will write the IO to the journal.

Bookmark Creation

Figure 23:
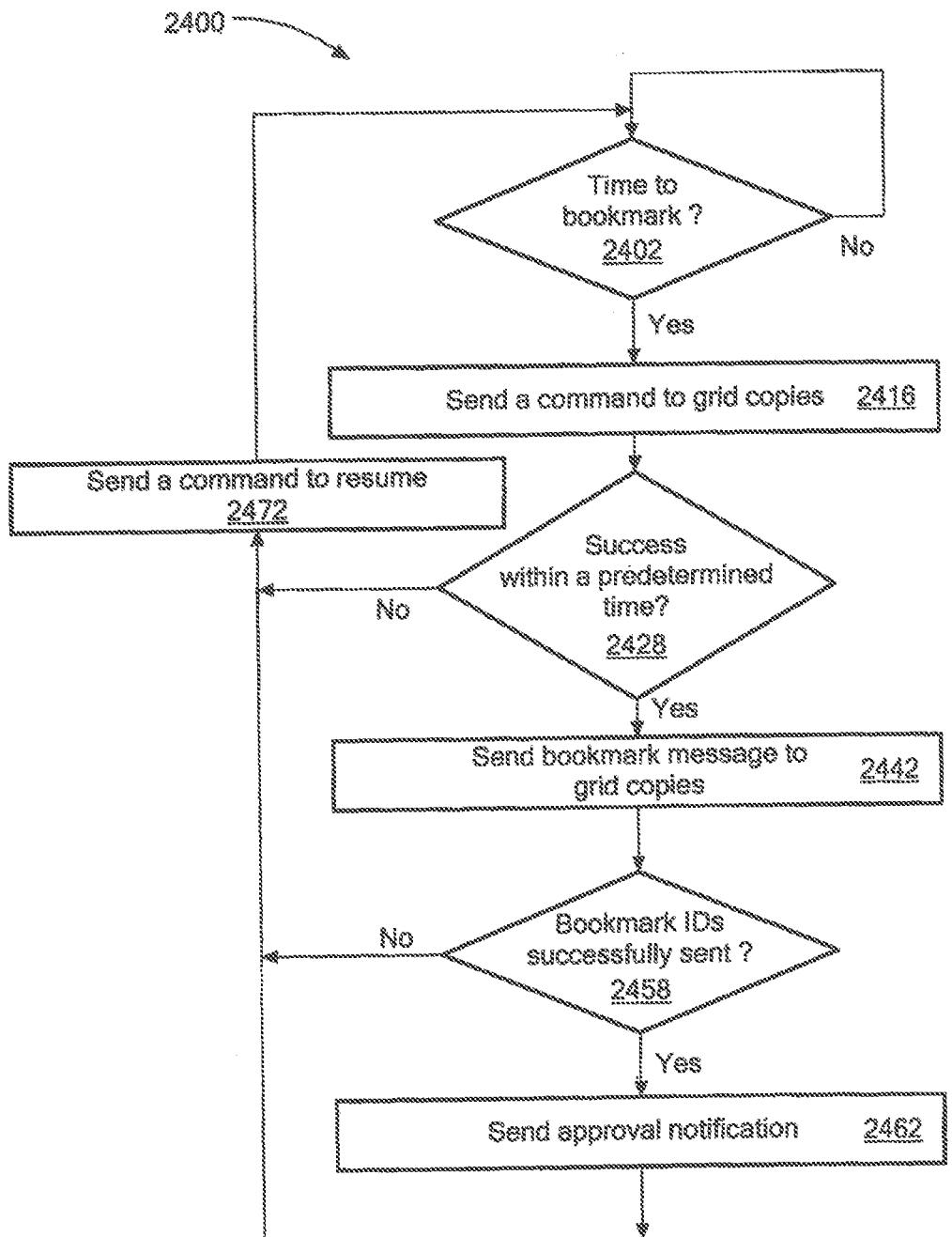
FIG. 23 is a flowchart of an example of a process to perform bookmarking on one grid copy.

Referring to FIG. 23, bookmarking is performed using a bookmark ID instead of using a timestamp because each copy may have different timestamps (e.g., the timestamp of the bookmark may be different between grid copies). In one example, the DPA 112a running the grid copy 0 performs the bookmarking. In one particular example, a process 2400 is used to bookmark. Process 2400 determines if it is time to bookmark (2402). For example, a bookmark is performed every 10 seconds. If it is time to bookmark, process 2400 sends a command to each of grid copies (2416). In other examples, the user may also create a bookmark in the same way (e.g., by calling a command which will run a process to create a bookmark). In one example, grid copy 0 sends a command to each of the grid copies (including the grid copy 0) to stop acknowledging and Copying IOs. If successful (e.g., a return message acknowledging receipt of the message is received) within a predetermined time (e.g., 2 seconds) (2428), process 2400 sends a bookmark message with a unique bookmark ID to the grid copies (2442). For example, the grid copy 0 sends a bookmark ID to the all grid copies (including grid copy 0).

Process 2400 deteimines if the bookmark IDs reached the grid copies (2458). For example, each of the grid copies that the bookmark ID was received. If the bookmark IDS were successfully received by the grid copies, process 2400 sends an approval notification that the bookmark ID is approved (2462).

Process 2400 sends a command to the grid copies to resume acknowledging IOs (2472). In one example, the resume command may be sent together with the approve command. For example, DPA 112a sends a command to the grid copies to resume acknowledging and copying IOs.

Figure 24:
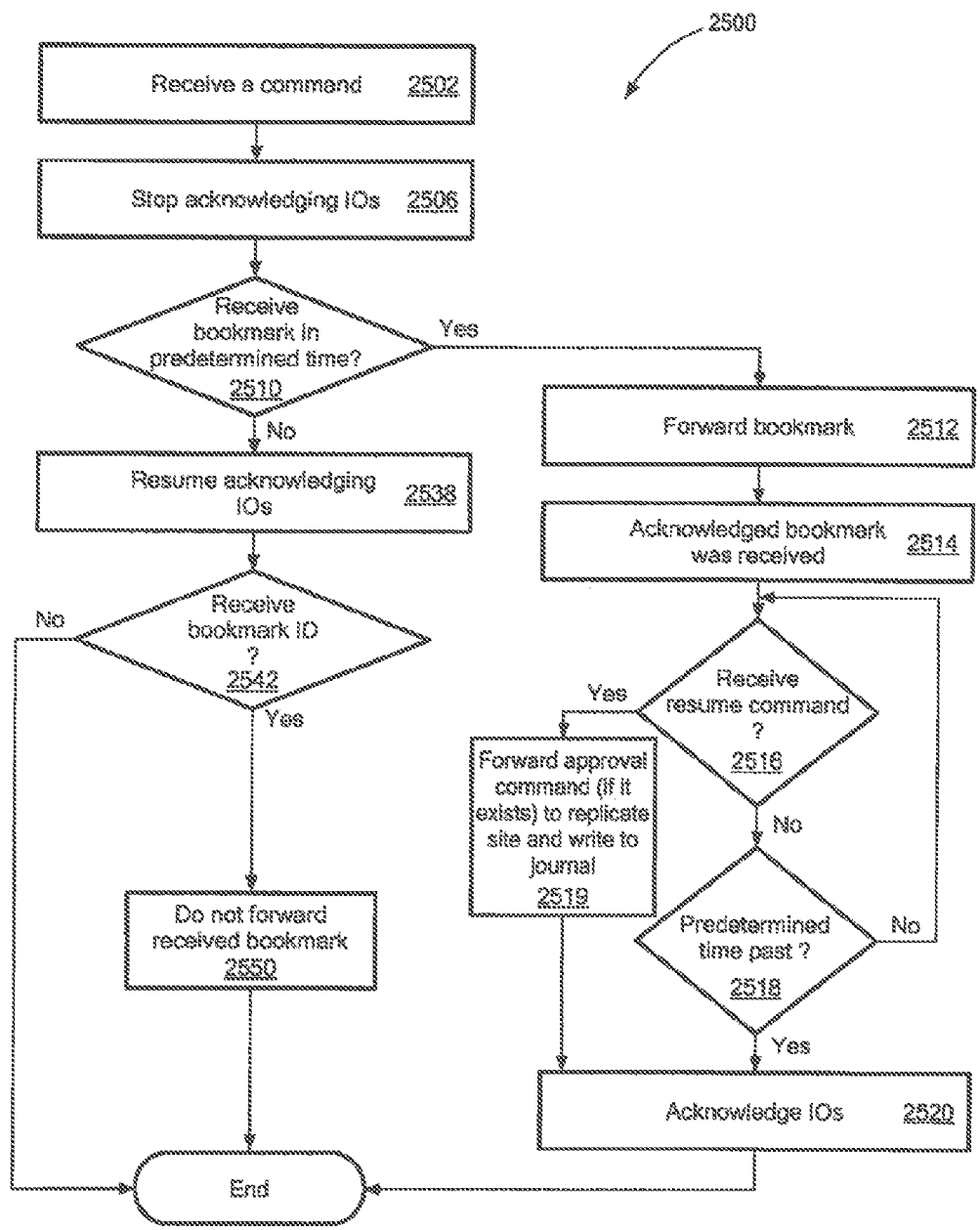
FIG. 24 is a flowchart of an example of a process to perform bookmarking at the remaining grid copies.

Referring to FIG. 24, each grid copy performs a process to receive the bookmark IDs, for example, a process 2500. Process 2500 receives a command (2502). For example, the grid copies receive a command (e.g., from processing block 2416) to stop acknowledging IOs and the grid copies then stop acknowledging IOs (e.g., to the protection agent 2000 (splitter)) (2506). Process 2500 determines if the bookmark ID is received in a predetermined amount of time (e.g., 2 seconds) (2510).

If the bookmark ID is received in a predetermined amount of time, the grid copy forwards the bookmark ID to the replica and its corresponding journal (2512) and acknowledge that bookmark was received successfully (2514), for example, to grid copy 0.

Process 2500 determines if the resume command was received (2516) (e.g., a resume command from processing block 2472) or a predetermined amount of time has past (2518). If the resume command is received at a grid copy with approval (e.g., approval command from processing block 2452) of the bookmark, and the grid copy is still delaying the acknowledgments, the approval command will be forwarded to the replica site and written to the journal (2519). If there is no approval or approval arrived after the timeout, the approve command will not be sent to the replica site and process 2500 resumes acknowledging IOs arriving from the protection agent 2000 (2520).

If the bookmark ID is not received in a predetermined amount of time or the predetermined amount of time has passed after the bookmark was received, process 2500 resumes acknowledging IOs (2538). For example, the grid copy resumes acknowledging IOs to the data protection agent

2000. Process 2500 determines if the bookmark ID has been received (2542) and if the bookmark ID is received, process 2500 does not forward the bookmark ID (e.g., forward the bookmark ID to its journal) (2550) and notifies grid copy 0 that bookmark creation failed.

A bookmark created this way is valid, if the bookmark is approved in the journal for each grid copy (i.e., the approve command arrived to the journal). In one example, it may be that some copies received the unique bookmark ID while other copies already have started acknowledging IOs, and in this example if the approval of the bookmark does not arrive for at least one grid copy then the bookmark will not be valid.

In one example, bookmarking is similar to bookmarking taught in U.S. Pat. No. 7,577,867 titled "Cross Tagging to Data for Consistent Delivery" which is incorporated herein in its entirety.

Initialization

In one example, a delta marking stream is kept to track changes in each grid copy. On initialization, each grid copy reads its own delta marking stream data.

In one example, each grid copy maintains its initialization process on it own. The central manager 780, running in grid copy 0, will start creating bookmarks after each grid copy completes its initialization process.

Access

As previously described herein a user chooses which mode to access an image, for example, in a virtual access mode or in a logged access mode.

Figure 25:
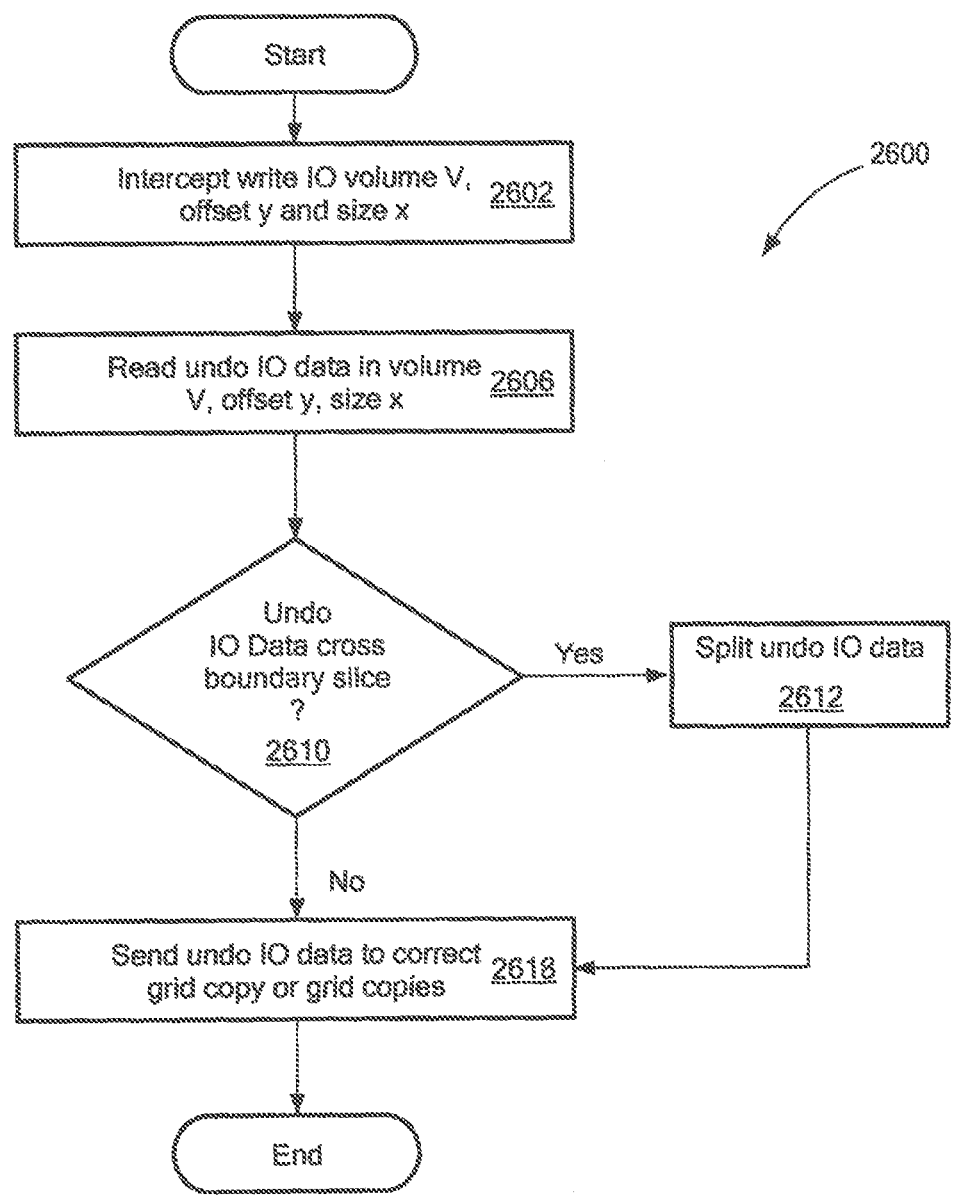
FIG. 25 is a flowchart of an example of as process to handle IOs in a logged access mode.

Referring to FIG. 25, a process 2600 is used to describe IO flow in the logged access mode. In one example, the process 2600 is used by the data protection agent 2000. In one example, reads in the logged access mode are ignored by the protection agent 2000 and go directly to the storage array.

The process 2600 intercepts a write IO for a volume V that is offset y blocks (e.g., offset y blocks from the beginning of the volume) and has a size of x blocks (2602). Process 2600 reads the undo data in the volume V, offset y and size x (2606) and determines if the undo IO data crosses a slice boundary (2610). If the undo IO data crosses a slice boundary, process 2600 split the undo IO (2612). Process 2600 sends the undo data based on the offset to the correct grid copy or copies (e.g., there may be more than one if an IO is split) (2608). At the DPA 112*a*, 112*b*, the DPA intercepts the Undo of the IO and writes it to the journal, after relevant grid copies acknowledge that the IO is complete.

Figure 26:
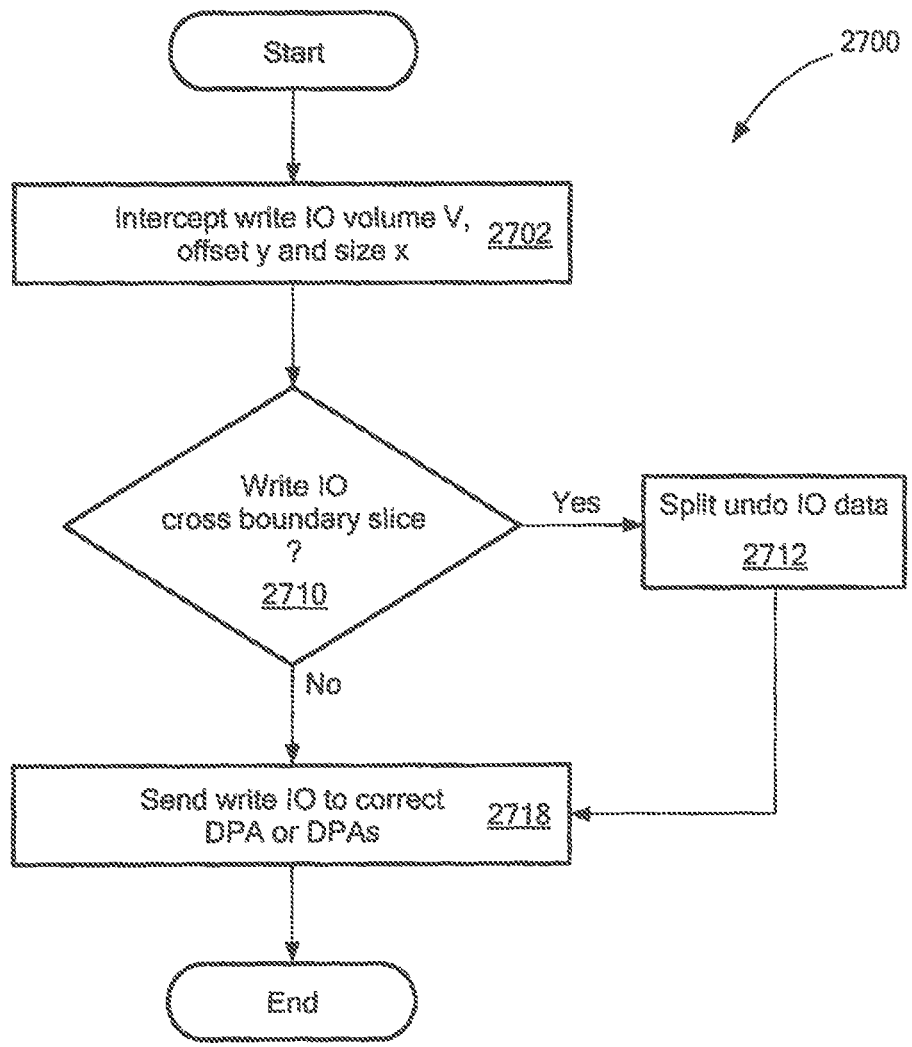
FIG. 26 is a flowchart of an example of a process to handle write IOs in a virtual access mode.

Referring to FIG. 26, a process 2700 is used to describe write IO flow in the virtual access mode. In one example, the process 2700 is used by the data protection agent 2000. The process 2700 intercepts a write IO for a volume V that is offset y blocks and has a size x blocks (2702). As used herein, a volume is an array of blocks, e.g., a block size in a storage array is 512 bytes. Process 2700 determines if the write IO data crosses a slice boundary (2710).

If the write IO crosses a slice boundary, process 2700 splits the write IO and sends each split part to the proper DPA (2712). Process 2700 sends a write IO to the DPAs to correct grid copies (2718).

Figure 27:
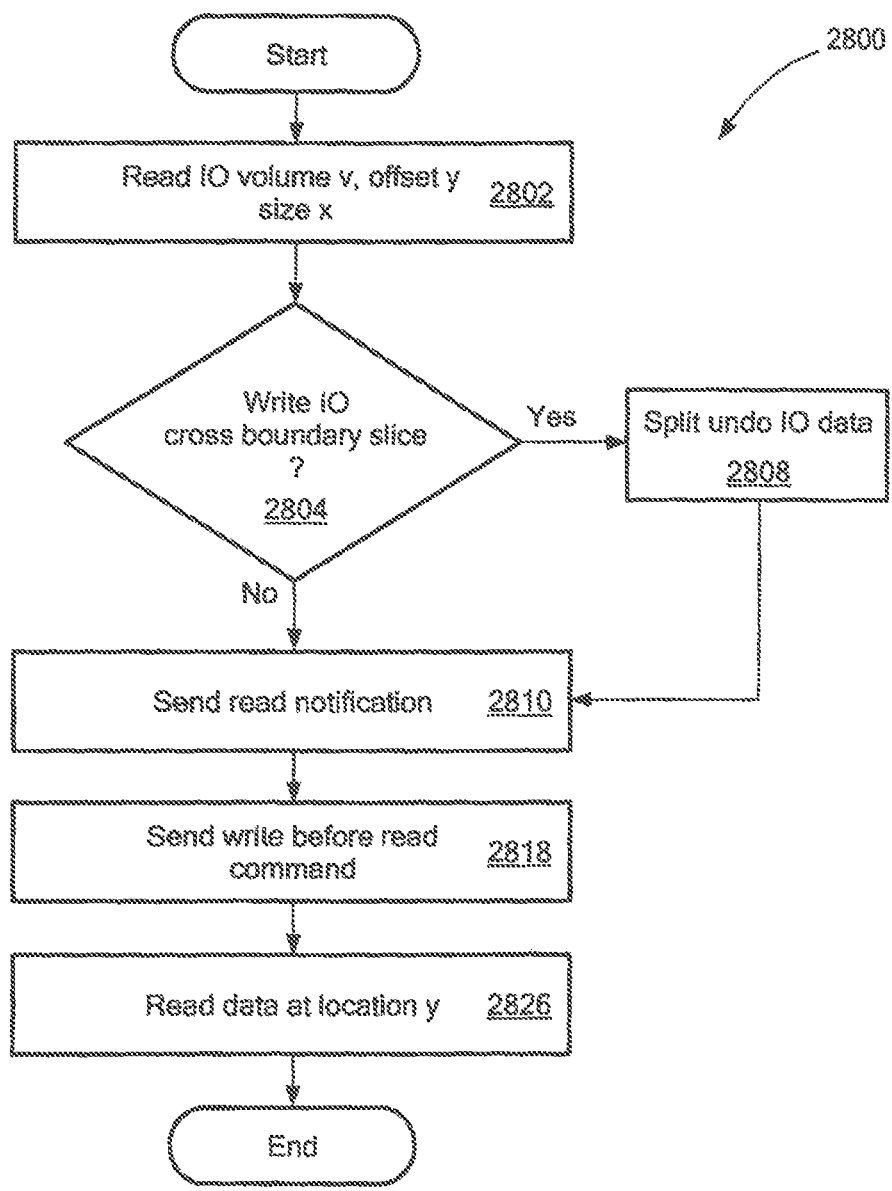
FIG. 27 is a flowchart of an example of a process to handle read IOs in a virtual access mode.

Referring to FIG. 27 describes a read IO flow in a virtual access mode. A process 2800 intercepts a read request to a volume V that is offset by y blocks and has a size x blocks (2802). Process 2800 determines if the IO cross slices boundaries (2804). If the read IO data crosses a slice boundary, process 2800 split the read IO (2808). Process 2800 sends read notifications of the read slices (2810) to the relevant DPAs including the offset, the size, and the volume ID.

The process 2800 will send write-before-read commands including data in the offsets of each slice (2818) to the relevant DPAs. The process 2800 will forward the read requests itself to the relevant DPAs. In one example, the process 2800 is performed by the data protection agent 2000. The above process is used when the data protection agent 2000 runs inside the storage array, because the DPA cannot read the data at the offset y if another user is currently uses the same data, because a deadlock will occur.

In some examples, a user may start working in the virtual access mode and would like to move to working in the logged access mode. In other examples of the virtualized CG, this process would have been very complex and would have been difficult coordinating between all the grid copies. In the example described herein, each grid copy may roll the data on it own, and move to the logged access mode while other grid copies continue to handle IOs in the virtual access mode. The splitter (data protection agent 2000) is aware of the state of each grid CG.

In one example, the data protection agent 2000 will handle IOs to grid copies which are in virtual access mode as described in FIGS. 26, 27.

In one example, the data protection agent 2000 will handle IOs for grid copies which are in the logged access and as described in FIG. 25.

Figure 28A:
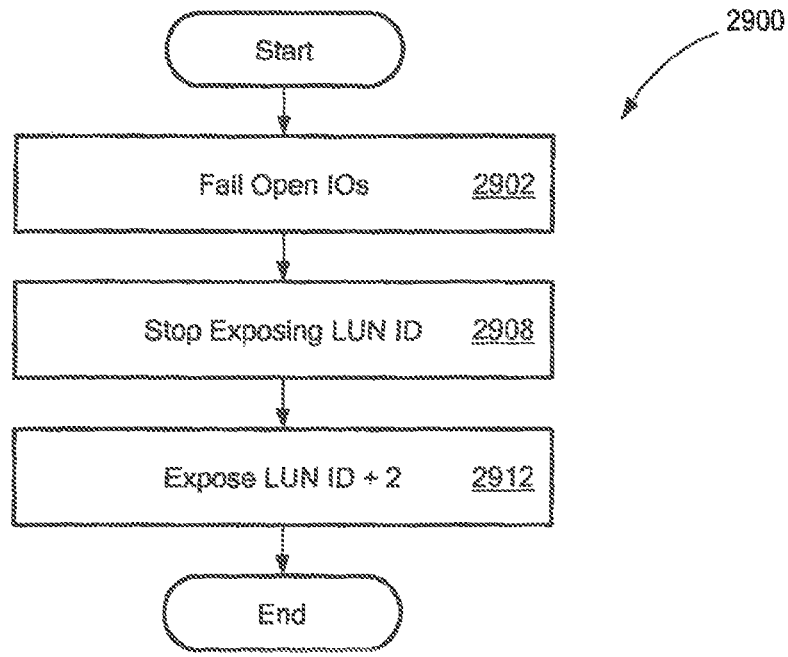
FIGS. 28A and 28B are flowcharts of an example of a process to transition one grid copy on the DPA from the virtual access mode to the logged access mode.

Referring to FIG. 28A, one example of a process to transition one grid copy on the DPA from the virtual access mode to the logged access mode is a process 2900. For example, the DPA finishes updating the volumes to the point in time the user is currently accessing, and thus can move to logged access mode. The process 2900 fails all open IOs (2902) and stops exposing the LUN ID (2908), which was used to receiver IOs from the protection agent for LU 1 for grid copy x. Process 2900 exposes LUN ID+2 (2912).

When the DPA performs process 2900, for example, the splitter IOs will fail. The data protection agent 2000, for example, performs a process 2950 to recover and move to the next stage.

Figure 28B:
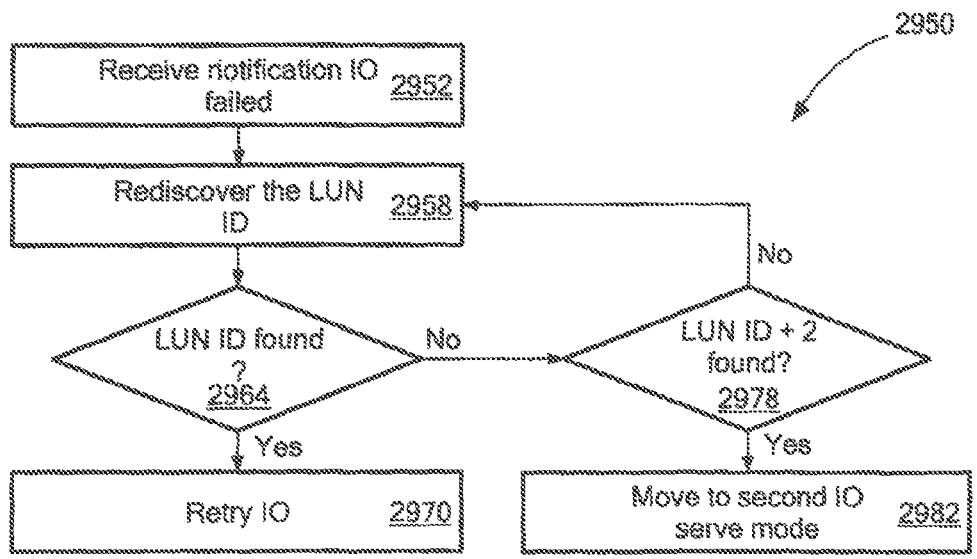

Referring to FIG. 28B, in one example, the data protection agent 2000 performs a process 2950. Process 2950 receives notification that the IO failed (2952). For example, from processing block 2908, the LUN ID is no longer available. Process 2950 attempts to rediscover the LUN ID (2958). The process 2950 determines if the LUN ID is found (2964). If the LUN ID is found, the process 2950 retries the IO (2970). If the LUN ID is not found, the process 2950 will try to find the LUN ID+2 since, from process block 2912, LUN ID+2 may now be available. If the LUN ID+2 is not found, then the process 2950 performs processing block 2958 again. If the LUN ID+2 is found, then the process 2950 moves to a second IO serve mode (2982). The second IO serve mode is a mode where IOs are handled as described in FIG. 25.

The processes described on FIGS. 28*a* and 28B are performed independently on each grid copy, when the grid copies moved to logged access mode, the virtualized CG is in a logged access mode.

Figure 29:
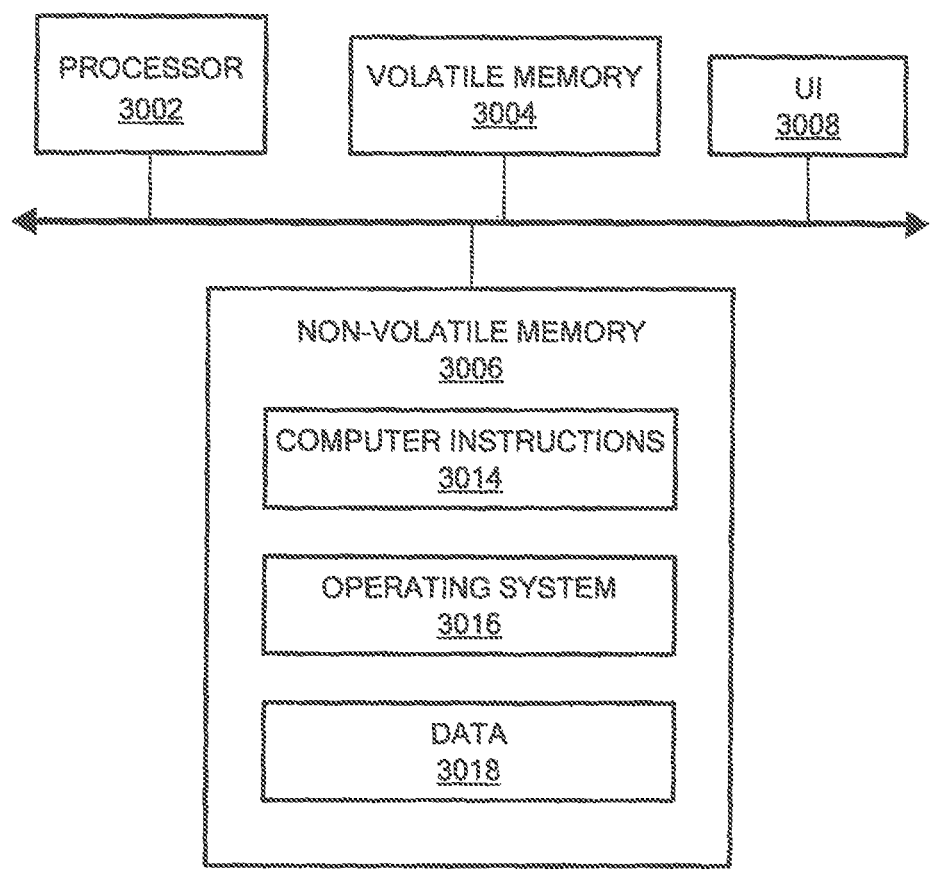
FIG. 29 is a computer on which any of the processes of FIGS. 23 to 25 may be implemented.

Referring to FIG. 29, a computer 3000 includes a processor 3002, a volatile memory 3004, a non-volatile memory 3006 (e.g., hard disk) and a user interface (UI) 3008 (e.g., a mouse, a keyboard, a display, touch screen and so forth). The non-volatile memory 3006 stores computer instructions 3014, an operating system 2016 and data 3018. In one example, the computer instructions 3014 are executed by the processor 3002 out of volatile memory 3004 to perform all or part of the processes described herein (e.g., processes 2200, 2400, 2500, 2600, 2700, 2800, 2900 and 2950).

The processes described herein (e.g., processes 2200, 2400, 2500, 2600, 2700, 2800, 2900 and 2950) are not limited to use with the hardware and software of FIG. 29; they may find applicability in any computing or processing environment and with any type of machine or set of machines that is capable of running a computer program. The processes described herein may be implemented in hardware, software, or a combination of the two. The processes described herein may be implement in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple site and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 2200, 2400, 2500, 2600, 2700, 2800, 2900 and 2950 are not limited to the specific processing order of FIGS. 22 to 28B, respectively. Rather, any of the processing blocks of FIGS. 22 to 28B may be re-ordered, combined or removed, performed in parallel or in serial, as necessary to achieve the results set forth above.

The processing blocks in FIGS. 22 to 28B associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
  running a first grid copy of a virtualized grid consistency group on a first data protection appliance (DPA) replicating a first portion of a logical unit;
  running a second grid copy of the virtualized grid consistency group on a second DPA replicating a second portion of the logical unit;
  sending IOs to the first DPA if the IOs are to a first set of offsets; and
  sending IOs to the second DPA if the IOs are to a second set of offsets.

2. The method of claim 1, further comprising splitting an IO for which an offset of the IO crosses a slice boundary.

3. The method of claim 1, further comprising:
  determining if an IO crosses a slice boundary;
  splitting the IO into multiple IOs; and
  sending each of the multiple IOs to a correct DPA if the IO crosses a slice boundary.

4. The method of claim 1, further comprising generating a unique bookmark based on an ID.

5. The method of claim 4, wherein generating a unique bookmark ID comprises generating a unique ID based on one of a user request or an amount of time.

6. The method of claim 4 wherein generating a bookmark comprises:
  sending a command from the first grid copy to each of the grid copies to cease acknowledging IOs; and
  after a send command is acknowledged:
  sending a bookmark with the unique ID from the first grid copy to the each grid copy, and
  sending a resume command to acknowledge IOs with an approval of the bookmark if all bookmarks are acknowledged.

7. The method of claim 6, further comprising:
  receiving at a grid copy the command from the first grid copy to cease acknowledging IOs;
  cease acknowledging IOs;
  determine if the bookmark with the unique ID is received in a predetermined amount of time forwarding the bookmark with the unique ID to a journal; and
  sending a status of the bookmark command to the first grid copy,
  determine if a resume command with approval of the bookmark with the unique ID is received in a predetermined amount of time;
  forwarding the approval with the unique ID to a journal; and
  resuming acknowledging the IOs.

8. The method of claim 7, further comprising:
  resuming acknowledging IOs if the bookmark with the unique ID is not received at a grid copy in the predetermined amount of time; and
  preventing forwarding of the bookmark and the approval command with the unique ID.

9. The method of claim 1, further comprising maintaining a delta marking stream at each grid copy.

10. The method of claim 9, further comprising:
  running an initialization process to synchronize a remote site with a production site at each grid copy;
  for each grid copy, reading changes tracked in its delta marking stream;
  reading the changes from the production site volumes,
  sending the changes to the remote site; and
  indicating that the initialization process is complete if all the grid copies have sent their differences to the remote site.

11. The method of claim 1, further comprising:
  intercepting an IO in a logged access mode;
  reading undo data of the IO;
  splitting the IO if the IO cross boundaries; and
  sending the undo data read to a first volume exposed by a DPA running a correct grid copy.

12. The method of claim 1, further comprising:
intercepting a read command to the volume V that is offset by y blocks and has a size x bytes;
reading the data to the volume;
splitting the read IO to read slices:
for each read slice if read crosses boundaries:
sending a notification of the read to the DPA running the correct grid copy;
sending a write-before-read command to the DPA running the correct grid copy comprising the data in the volume V that is offset by y blocks and has the size x to the DPA; and
sending a read command to at the DPA running the correct grid copy for the volume V.

13. The method of claim 1, further comprising, in a virtual access mode:
intercepting a write IO;
splitting the write IO into smaller portions if the write IO crosses boundaries; and
sending each of the smaller portions to a second volume at a correct DPA.

14. The method of claim 1, further comprising:
move to a logged access mode if a grid copy completes rolling back to an image;
checking that all of the grid copies have completed rolling back to the image; and
indicating that the virtual CG is in the logged access mode if all of the grid copies have completed rolling back to the image.

15. An article comprising:
a non-transitory machine-readable medium that stores executable instructions, the instructions causing a machine to:
run a first grid copy of a virtualized grid consistency group on a first data protection appliance (DPA) replicating a first portion of a logical unit;
run a second grid copy of the virtualized grid consistency group on a second DPA replicating a second portion of the logical unit;
send IOs to the first DPA if the IOs are to a first set of offsets; and
send IOs to the second DPA if the IOs are to a second set of offsets.

16. The article of claim 15, further comprising instructions causing the machine to split an IO for which an offset of the IO crosses a slice boundary.

17. The article of claim 15, further comprising instructions causing the machine to:
determine if an IO crosses a slice boundary; and
split the IO into multiple IOs;
send the multiple IOs to a correct DPA if the IO crosses a slice boundary.

18. An apparatus, comprising:
hardware circuitry to:
run a first grid copy of a virtualized grid consistency group on a first data protection appliance (DPA) replicating a first portion of a logical unit;
run a second grid copy of the virtualized grid consistency group on a second DPA replicating a second portion of the logical unit;
send IOs to the first DPA if the IOs are to a first set of offsets; and
send IOs to the second DPA if the IOs are to a second set of offsets,
wherein the hardware circuitry comprises at least one of a processor, a memory, programmable logic or logic gates.

19. The apparatus of claim 18, further comprising circuitry to split an IO for which an offset of the IO crosses a slice boundary.

20. The apparatus of claim 18, further comprising circuitry to:
determine if an IO crosses a slice boundary;
split the IO into multiple IOs; and
send the multiple IOs to a correct DPA if the IO crosses a slice boundary.

* * * * *